(12) United States Patent
Schmitz et al.

(10) Patent No.: US 9,340,316 B2
(45) Date of Patent: May 17, 2016

(54) POLY(ETHYLENE TEREPHTHALATE)(APET) MULTILAYER OXYGEN-SCAVENGING CONTAINERS AND METHODS OF MAKING

(71) Applicant: Mullinix Packages, Inc., Fort Wayne, IN (US)

(72) Inventors: Brian Schmitz, Fort Wayne, IN (US); Luther A. Gross, Churubusco, IN (US); Boh C. Tsai, Inverness, IL (US); Matt Schiffli, Fort Wayne, IN (US); Gary Klimek, Fort Wayne, IN (US)

(73) Assignee: Mullinix Packages, Inc., Fort Wayne, IN (US)

( * ) Notice: Subject to any disclaimer, the term of this patent is extended or adjusted under 35 U.S.C. 154(b) by 229 days.

(21) Appl. No.: 14/172,038

(22) Filed: Feb. 4, 2014

(65) Prior Publication Data
US 2014/0251993 A1      Sep. 11, 2014

Related U.S. Application Data

(60) Provisional application No. 61/774,109, filed on Mar. 7, 2013.

(51) Int. Cl.
| | |
|---|---|
| *B65D 1/40* | (2006.01) |
| *B65D 81/26* | (2006.01) |
| *B32B 27/08* | (2006.01) |
| *B32B 27/20* | (2006.01) |

(Continued)

(52) U.S. Cl.
CPC . *B65D 1/40* (2013.01); *B32B 27/08* (2013.01); *B32B 27/20* (2013.01); *B32B 27/285* (2013.01); *B32B 27/36* (2013.01); *B65D 81/267* (2013.01); *B32B 2250/24* (2013.01); *B32B 2264/105* (2013.01); *B32B 2270/00* (2013.01); *B32B 2307/306* (2013.01); *B32B 2307/702* (2013.01); *B32B 2307/704* (2013.01); *B32B 2307/7244* (2013.01); *B32B 2439/70* (2013.01); *Y10T 156/10* (2015.01)

(58) Field of Classification Search
CPC ...... B65D 1/40; B65D 81/267; Y10T 156/10; B32B 27/08; B32B 27/20; B32B 27/285; B32B 27/36; B32B 2250/24; B32B 2264/105; B32B 2270/00; B32B 2307/306; B32B 2307/702; B32B 2307/704; B32B 2307/7244; B32B 2439/70

See application file for complete search history.

(56) References Cited

U.S. PATENT DOCUMENTS

| | | |
|---|---|---|
| 4,407,897 A | 10/1983 | Farrell et al. |
| 4,425,410 A | 1/1984 | Farrell et al. |
| 4,464,443 A | 8/1984 | Farrell et al. |

(Continued)

FOREIGN PATENT DOCUMENTS

| | | |
|---|---|---|
| EP | 0083826 A1 | 7/1983 |
| WO | 2009032418 A2 | 3/2009 |

OTHER PUBLICATIONS

Roodvoets, Enhanced Gas Barriers in Thermoformed Trays, Thermoforming Quarterly, pp. 1-3 and 8-10, Second Quarter 2013.

(Continued)

*Primary Examiner* — Michael C Miggins
(74) *Attorney, Agent, or Firm* — MacMillan, Sobanski & Todd, LLC

(57) ABSTRACT

An oxygen-scavenging multi-layer container and methods of making, controlling, and using the same are disclosed.

49 Claims, 24 Drawing Sheets

(51) Int. Cl.
   *B32B 27/28*      (2006.01)
   *B32B 27/36*      (2006.01)

(56) References Cited

U.S. PATENT DOCUMENTS

| | | | |
|---|---|---|---|
| 4,536,409 A | 8/1985 | Farrell et al. |
| 4,579,757 A | 4/1986 | Su et al. |
| 4,642,968 A | 2/1987 | McHenry et al. |
| 4,667,454 A | 5/1987 | McHenry et al. |
| 4,702,966 A | 10/1987 | Farrell et al. |
| 4,770,944 A | 9/1988 | Farrell et al. |
| 4,816,342 A | 3/1989 | Farrell et al. |
| 4,880,129 A | 11/1989 | McHenry et al. |
| 5,021,515 A | 6/1991 | Cochran et al. |
| 5,288,764 A | 2/1994 | Rotter et al. |
| 5,340,846 A | 8/1994 | Rotter et al. |
| 5,446,111 A | 8/1995 | Rotter et al. |
| 5,536,793 A | 7/1996 | Rotter et al. |
| 5,556,926 A | 9/1996 | Rotter et al. |
| 5,744,056 A | 4/1998 | Venkateshwaran et al. |
| 6,300,469 B1 | 10/2001 | Freundlich et al. |
| 6,369,148 B2 | 4/2002 | Chiang et al. |
| 6,525,123 B1 | 2/2003 | Yang et al. |
| 6,586,514 B2 | 7/2003 | Chiang et al. |
| 7,943,216 B2 | 5/2011 | Liu et al. |
| 8,110,261 B2 | 2/2012 | Solovyov et al. |
| 2006/0128861 A1 | 6/2006 | Stewart et al. |
| 2009/0061062 A1 | 3/2009 | Beckwith et al. |
| 2011/0008554 A1 | 1/2011 | Chen et al. |
| 2012/0114887 A1 | 5/2012 | Drbohlav, III et al. |
| 2012/0183709 A1 | 7/2012 | Schmidt et al. |
| 2012/0214935 A1 | 8/2012 | Roodvoets et al. |
| 2012/0225227 A1 | 9/2012 | Radosta et al. |
| 2012/0308751 A1 | 12/2012 | Neill et al. |

OTHER PUBLICATIONS

OxyClear™ Barrier Resin a New Oxygen Scavenging PET, Invista Polymer & Resins, The Packaging Conference—Las Vegas, 2010.

PCT International Search Report and the Written Opinion, Appln. No. PCT/US2014/21102, filed Mar. 6, 2014, date of mailing Jun. 6, 2014.

PCT International Search Report and the Written Opinion, Appln. No. PCT/US14/21108, filed Mar. 6, 2014, date of mailing Jun. 5, 2014.

| | 1% total BB-10 | | |
|---|---|---|---|
| Days | Trial #1: APET Control | Trial #10: Mono (1% BB-10) | Trial #12: Multi (1% BB-10) |
| 0 | 21.6 | 22.4 | 20.0 |
| 18 | 21.9 | 21.7 | 13.8 |
| 31 | 22.6 | 21.5 | |
| 32 | | | 12.5 |
| 38 | 22.0 | 21.9 | 12.9 |
| 50 | 22.5 | 21.6 | 11.7 |

| | 2% total BB-10 | | |
|---|---|---|---|
| Days | Trial #1: APET Control | Trial #6: Mono (2% BB-10) | Trial #8: Multi (2% BB-10) |
| 0 | 21.6 | 21.8 | 20.5 |
| 5 | | 21.5 | |
| 18 | 21.9 | | 14.8 |
| 23 | | 21.8 | |
| 31 | 22.6 | | 13.6 |
| 36 | | 21.7 | |
| 38 | 22.0 | | 13.7 |
| 43 | | 22.0 | |
| 50 | 22.5 | | 12.4 |
| 55 | | 21.6 | |

| | 3% total BB-10 | | |
|---|---|---|---|
| Days | Trial #1: APET Control | Trial #2: Mono (3% BB-10) | Trial #4: Multi (3% BB-10) |
| 0 | 21.6 | 21.5 | 21.4 |
| 5 | | 21.0 | |
| 18 | 21.9 | | 14.2 |
| 23 | | 21.1 | |
| 31 | 22.6 | | 13.2 |
| 36 | | 21.3 | |
| 38 | 22.0 | | 13.1 |
| 43 | | 21.4 | |
| 50 | 22.5 | | 11.8 |
| 55 | | 21.0 | |

| 1% total BB-10 | | | |
|---|---|---|---|
| Days | Trial #1: APET Control | Trial #10: Mono (1% BB-10) | Trial #12: Multi (1% BB-10) |
| 0 | 0 | 0 | 0 |
| 5 |  | 0.14 | -0.03 |
| 6 | 0.18 |  |  |
| 16 |  | 0.37 | -0.08 |
| 17 | 0.28 |  |  |
| 36 |  | 0.81 | -0.04 |
| 37 | 0.76 |  |  |
| 42 |  | 0.91 | -0.02 |
| 43 | 0.89 |  |  |
| 55 |  | 1.24 | 0.10 |
| 56 | 1.16 |  |  |

| 2% total BB-10 | | | |
|---|---|---|---|
| Days | Trial #1: APET Control | Trial #6: Mono (2% BB-10) | Trial #8: Multi (2% BB-10) |
| 0 | 0 | 0 | 0 |
| 6 | 0.18 | 0.12 | 0.02 |
| 17 | 0.28 | 0.31 | -0.04 |
| 37 | 0.76 | 0.77 | -0.14 |
| 43 | 0.89 | 0.82 | -0.16 |
| 56 | 1.16 | 1.16 | -0.22 |

| 3% total BB-10 | | | |
|---|---|---|---|
| Days | Trial #1:<br>APET Control | Trial #2:<br>Mono (3% BB-10) | Trial #4:<br>Multi (3% BB-10) |
| 0 | 0 | 0 | 0 |
| 6 | 0.18 | 0.17 | 0.03 |
| 17 | 0.28 | 0.34 | -0.04 |
| 37 | 0.76 | 0.81 | -0.15 |
| 43 | 0.89 | 0.92 | -0.17 |
| 56 | 1.16 | 1.26 | -0.23 |

| Trial | BB-10 concentration in the layer | Absorption capacity (cc/g of BB-10) |
|---|---|---|
| #11 | 5% | 60.7 |
| #12 | 5% | 102.0 |
| #13 | 5% | 72.0 |
| #7 | 10% | 86.9 |
| #8 | 10% | 99.7 |
| #9 | 10% | 81.4 |
| #3 | 15% | 97.0 |
|  |  |  |
|  |  |  |
| #4 | 15% | 114.9 |
| #5 | 15% | 94.1 |
| #14 | 25% | 119.2 |
| #15 | 33% | 148.6 |
| #16 | 50% | 149.5 |

| Days | #3 (3% BB-10) | #4 (3% BB-10) | #5 (3% BB-10) | #7 (2% BB-10) | #8 (2% BB-10) | #9 (2% BB-10) | #11 (1% BB-10) | #12 (1% BB-10) | #13 (1% BB-10) | #14 (5% BB-10) | #15 (5% BB-10) | #16 (5% BB-10) |
|---|---|---|---|---|---|---|---|---|---|---|---|---|
| 0 | 0 | 0 | 0 | 0 | 0 | 0 | 0 | 0 | 0 | 0 | 0 | 0 |
| 5 | 34.6 | | | 35.8 | | | 19.7 | | | | | |
| 18 | | 84.8 | 69.2 | | 67.2 | 54.7 | | 72.7 | 44.1 | 92.8 | 95.0 | 67.3 |
| 23 | 69.3 | | | 69.1 | | | 44.4 | | | | | |
| 31 | | 95.8 | 81.6 | | 81.9 | 66.1 | | | | | | |
| 32 | | | | | | | | 88.6 | 61.4 | 112.8 | 135.8 | 133.8 |
| 36 | 81.5 | | | 76.6 | | | | | | | | |
| 37 | | | | | | | 52.9 | | | | | |
| 38 | | 97.2 | 79.2 | | 80.6 | 62.2 | | 84.3 | 48.8 | 109.3 | 135.5 | 134.9 |
| 43 | 80.5 | | | 74.5 | | | 51.7 | | | | | |
| 50 | | 113.1 | 93.5 | | 95.7 | 82.9 | | 97.8 | 73.2 | 118.8 | 147.1 | 148.5 |
| 55 | 96.5 | | | 85.5 | | | 60.7 | | | | | |
| 61 | | 114.9 | 94.1 | | 99.7 | 81.4 | | 102.0 | 72.0 | 119.2 | 148.6 | 149.5 |
| 66 | 97.0 | | | 86.9 | | | 60.7 | | | | | |

FIG. 12

| | #1 Control (0% BB-10) | #13: 1% BB-10 | #9:2% BB-10 | #5: 3% BB-10 |
|---|---|---|---|---|
| Days | 0 | 0 | 0 | 0 |
| 0 | | 0.11 | 0.03 | |
| 5 | 0.18 | | | 0.01 |
| 6 | | 0.22 | 0.06 | |
| 16 | 0.28 | | | 0.00 |
| 17 | | 0.49 | 0.17 | |
| 36 | 0.76 | | | 0.07 |
| 37 | | 0.59 | 0.22 | |
| 42 | 0.89 | | | 0.06 |
| 43 | | 0.86 | 0.38 | |
| 55 | 1.16 | | | 0.22 |
| 56 | | 1.06 | 0.55 | |
| 66 | 1.36 | | | 0.33 |

| Days | #1 Control (0% BB-10) | #12: 1% BB-10) | #8:2% BB-10 | #4: 3% BB-10 |
|---|---|---|---|---|
|  | 0 | 0 | 0 | 0 |
| 0 |  | -0.03 |  |  |
| 5 | 0.18 |  | 0.02 | 0.03 |
| 6 |  | -0.08 |  |  |
| 16 | 0.28 |  | -0.04 | -0.04 |
| 17 |  | -0.04 |  |  |
| 36 | 0.76 |  | -0.14 | -0.15 |
| 37 |  | -0.02 |  |  |
| 42 | 0.89 |  | -0.16 | -0.17 |
| 43 |  | 0.10 |  |  |
| 55 | 1.16 |  | -0.22 | -0.23 |
| 56 |  | 0.20 |  |  |
| 66 | 1.36 |  | -0.19 | -0.29 |
| 67 |  |  |  |  |

|  | #1 Control (0% BB-10) | #11: 1% BB-10 | #7:2% BB-10 | #3: 3% BB-10 |
|---|---|---|---|---|
| Days | 0 | 0 | 0 | 0 |
| 0 |  |  |  |  |
| 5 | 0.18 |  | -0.01 | 0.11 |
| 6 |  | -0.17 |  |  |
| 16 | 0.28 |  | -0.15 | 0.06 |
| 17 |  | -0.13 |  |  |
| 36 | 0.76 |  | -0.34 | -0.21 |
| 37 |  | -0.10 |  |  |
| 42 | 0.89 |  | -0.38 | -0.29 |
| 43 |  | 0.05 |  |  |
| 55 | 1.16 |  | -0.44 | -0.42 |
| 56 |  | 0.18 |  |  |
| 66 | 1.36 |  | -0.43 | -0.49 |
| 67 |  |  |  |  |

| Headspace Oxygen Absorption | | | |
|---|---|---|---|
| Permeation cc/100 in2.day.atm (permeation rate thru the outer layer) | 3 | 1.5 | 1 |
| 1% BB-10 | No (#13) | Yes (#12) | Yes (#11) |
| 2% BB-10 | No (#9) | Yes (#8) | Yes (#7) |
| 3% BB-10 | No (#5) | Yes (#4) | Yes (#3) |

FIG. 16

| | 2% BB-10 | |
|---|---|---|
| | 10446: 2% BB-10 (60/20/20 and 10/90 BB-10/Merge) | |
| | Oxy 2: 2% BB-10 (60/10/30 and 20/80 BB-10/merge) | |
| Days | 10446: 10/90 BB-10/Merge | Oxy 2: 20/80 BB-10/Merge |
| 0 | 0.0004 | 0.0028 |
| 3 | 0.16 | 0.19 |
| 11 | 1.02 | 0.64 |
| 13 | 1.37 | 0.38 |
| 18 | 2.97 | 1.07 |
| 27 | 6.79 | 3.83 |
| 38 | 9.37 | 10.31 |
| 47 | 10.27 | 12.59 |
| 67 | 11.95 | 14.88 |
| 75 | 12.59 | 15.36 |
| 98 | 13.41 | 16.48 |

| 1. #10446: 12 mil CPET / 4 mil (10% BB-10 +90% Merge) / 4 mil APET, 2% total BB-10 |||
|---|---|---|
| BB-10/Merge: 10%/90% |||
| Days | 10446: 7 days in storage | 10446: 42 days in storage |
| 0 | 0 | 0 |
| 3 | 0.16 | 0.56 |
| 6 |  | 1.57 |
| 7 |  | 2.58 |
| 10 |  | 3.05 |
| 11 | 1.02 |  |
| 13 | 1.37 |  |
| 14 |  | 3.88 |
| 18 | 2.97 |  |
| 27 | 6.79 |  |
| 38 | 9.37 |  |
| 40 |  | 8.61 |
| 47 | 10.27 |  |
| 56 |  | 10.01 |
| 67 | 11.95 |  |

| 2. Oxy 2: 12 mil CPET / 2 mil (20% BB-10 + 80% Merge) / 6 mil APET, 2% total BB-10 | | |
|---|---|---|
| BB-10/Merge: 20%/80% | | |
| Days | Oxy 2: 7 days in storage | Oxy 2: 42 days in storage |
| 0 | 0 | 0 |
| 3 | 0.19 | 0.26 |
| 6 | | 1.55 |
| 7 | | 1.73 |
| 10 | | 2.81 |
| 11 | 0.64 | |
| 13 | 0.38 | |
| 14 | | 3.56 |
| 18 | 1.07 | |
| 27 | 3.83 | |
| 38 | 10.31 | |
| 40 | | 10.63 |
| 47 | 12.58 | |
| 56 | | 12.25 |
| 67 | 14.88 | |

| 3. Oxy 3: 12 mil CPET / 4 mil (20% BB-10 + 80% Merge) / 4 mil APET, 4% total BB-10 | | |
|---|---|---|
| BB-10/Merge: 20%/80% | | |
| Days | Oxy 3: 7 days in storage | Oxy 3: 42 days in storage |
| 0 | 0 | 0 |
| 3 | 0.33 | 0.62 |
| 6 | | 1.78 |
| 7 | | 2.64 |
| 10 | | 4.19 |
| 11 | 0.74 | |
| 13 | 0.74 | |
| 14 | | 5.63 |
| 18 | 1.58 | |
| 27 | 7.34 | |
| 38 | 14.48 | |
| 40 | | 13.78 |
| 47 | 16.63 | |
| 56 | | 15.01 |
| 67 | 18.97 | |

| 4. Oxy 4: 12 mil CPET / 2.7 mil (30% BB-10 + 70% Merge) / 5.3 mil APET, 4% total BB-10 | | |
|---|---|---|
| BB-10/Merge: 30%/70% | | |
| Days | Oxy 4: 7 days in storage | Oxy 4: 42 days in storage |
| 0 | 0 | 0 |
| 3 | 0.22 | 0.30 |
| 6 | | 1.11 |
| 7 | | 1.64 |
| 10 | | 2.34 |
| 11 | 0.36 | |
| 13 | 0.42 | |
| 14 | | 3.46 |
| 18 | 1.89 | |
| 27 | 9.45 | |
| 38 | 16.50 | |
| 40 | | 12.71 |
| 47 | 19.15 | |
| 56 | | 14.36 |
| 67 | 21.58 | |

| 5. Oxy 5: 12 mil CPET / 2 mil (40% BB-10 + 60% Merge) / 6 mil APET, 4% total BB-10 | | |
|---|---|---|
| BB-10/Merge: 40%/60% | | |
| | | |
| Days | Oxy 5: 7 days in storage | Oxy 5: 42 days in storage |
| 0 | 0 | 0 |
| 3 | 0.25 | 0.14 |
| 6 | | 0.11 |
| 7 | | 0.25 |
| 10 | | 0.40 |
| 11 | 0.16 | |
| 13 | -0.12 | |
| 14 | | 0.37 |
| 18 | 0.03 | |
| 27 | -0.10 | |
| 38 | -0.11 | |
| 40 | | 7.41 |
| 47 | -0.06 | |
| 56 | | 13.02 |
| 67 | 2.17 | |
| 75 | 4.89 | |

|  | BB-10/Merge | Incubation time* |
|---|---|---|
| #10446 | 10%/90% | 17 days |
| Oxy 2 | 20%/80% | 21 days |
| Oxy 3 | 20%/80% | 21 days |
| Oxy 4 | 30%/80% | 21 days |
| Oxy 5 | 40%/60% | 60 days |
| Incubation time*: The oxygen absorption onset time in the figures pluses the storage time 7 days. | | |

FIG. 23

|  | BB-10 / Merge | Transition time* |
|---|---|---|
|  |  |  |
| #14 | 25% / 75% | 30 days |
| #15 | 33% / 67% | 50 days |
| #16 | 50% / 50% | 56 days |
|  |  |  |
| Transition time*: The peak time in the figures pluses the storage time 14 days. | | |

FIG. 27

| Trial #14: 6.6 mil APET / 2.2 mil (25% BB-10 + 75% Merge) / 2.2 mil APET, 5% total BB-10 | | |
|---|---|---|
| BB-10/Merge: 25%/75% | | |
| Days | #14: 14 days in storage | #14: 71 days in storage |
| 0 | 0 | 0 |
| 1 | | -0.0368 |
| 5 | 0.1538 | |
| 6 | | -0.0772 |
| 12 | | -0.0846 |
| 15 | | -0.1356 |
| 16 | 0.2482 | |
| 36 | 0.0816 | |
| 42 | -0.0228 | |
| 55 | -0.2566 | |
| 65 | -0.4622 | |
| 71 | -0.4814 | |

| Trial #15: 6.6 mil APET / 1.7 mil (33% BB-10 + 67% Merge) / 2.7 mil APET, 5% total BB-10 | | |
|---|---|---|
| BB-10/Merge: 33%/67% | | |
| Days | #15: 14 days in storage | #15: 71 days in storage |
| 0 | 0 | 0 |
| 1 |  | -0.0416 |
| 5 | 0.1306 |  |
| 6 |  | -0.081 |
| 12 |  | -0.0908 |
| 15 |  | -0.1518 |
| 16 | 0.3888 |  |
| 36 | 0.572 |  |
| 42 | 0.5538 |  |
| 55 | 0.3562 |  |
| 65 | 0.1632 |  |
| 71 | 0.151 |  |

| Trial #16: 6.6 mil APET / 1.1 mil (50% BB-10 + 50% Merge) / 3.3 mil APET, 5% total BB-10 | | |
|---|---|---|
| BB-10/Merge: 50%/50% | | |
| Days | #16:<br>14 days in storage | #16:<br>71 days in storage |
| 0 | 0 | 0 |
| 1 |  | -0.0598 |
| 5 | 0.1234 |  |
| 6 |  | -0.1406 |
| 12 |  | -0.228 |
| 15 |  | -0.3022 |
| 16 | 0.3764 |  |
| 36 | 0.7082 |  |
| 42 | 0.7992 |  |
| 55 | 0.6918 |  |
| 65 | 0.503 |  |
| 71 | 0.4492 |  |

POLY(ETHYLENE TEREPHTHALATE)(APET) MULTILAYER OXYGEN-SCAVENGING CONTAINERS AND METHODS OF MAKING

CROSS-REFERENCE TO RELATED APPLICATIONS

This is application which claims the priority to U.S. Provisional Application No. 61/774,109, filed Mar. 7, 2013, the entire disclosures of which are expressly incorporated herein by reference.

TECHNICAL FIELD

Described herein are multi-layer containers usable in the plastics packaging industry. Further disclosed are methods of making and using multi-layer containers with oxygen-scavenging properties and methods of controlling the oxygen scavenging incubation period of multi-layer containers.

BACKGROUND OF THE INVENTION

In food and beverage packaging, metal cans and glass bottles were traditionally the preferred packages. With the introduction of polypropylene (PP) and ethylene vinyl alcohol copolymer (EVOH) multi-layer containers, PP/EVOH containers, and poly(ethylene terephthalate) PET containers in the 1980s, a portion of the metal-based and glass-based packages were replaced by plastics-based packages.

The shelf life of a plastic package is determined by the amount of oxygen that permeates into the package. A container made from amorphous poly(ethylene terephthalate) (APET) typically has a shelf life of three to six months. A container made from crystalline poly(ethylene terephthalate) (CPET) typically has a shelf life of five to ten months. Because both APET and CPET containers have a PET recycling code ("1"), which is considered most environmental friendly due to the successful development of recycling infrastructure over the years; it would be desirable to improve the oxygen barrier of these materials so they can be used extensively in packaging for food and other oxygen-sensitive products. Many unsuccessful attempts have been made at incorporating an effective oxygen scavenger into the walls of PET containers such that the container has zero or negative oxygen permeation to compete with the metal-based and glass-based packages.

Not only do commercially available oxygen scavenging containers fall short of achieving zero or negative oxygen permeation, but they have several other drawbacks. For instance, many articles of active packaging suffer from two oxygen absorption initiation problems: (1) short or no induction period and (2) long or infinite induction period. When the induction period is too short, it allows for ambient oxygen absorption during inventory before the container is filled (i.e., before oxygen absorption is desired). On the other hand, when the induction period is too long, they require some sort of triggering agent, such as ultraviolet light or water, to begin scavenging. A further disadvantage of these containers is that such materials may require thick sidewalls, which adds to cost.

Many commercially available oxygen-scavenging containers begin to scavenge oxygen immediately. Without an incubation period, the expensive oxygen scavenger is wasted during the inventory period. It is common in the industry for containers to be in transportation from supplier to user for a couple months. It is therefore desirable to keep the container from scavenging oxygen during inventory and start oxygen scavenging immediately when the container is filled with product.

It would be beneficial to develop a plastics-based package for food or beverages with less oxygen permeation and more controlled oxygen scavenging. There remains a need for packaging materials that perform these feats in a more efficient and cost-effective manner. It would be beneficial to improve the shelf life of containers made specifically from PET-based materials. It would be further beneficial to discover efficient methods of manufacturing such containers.

There is no admission that the background art disclosed in this section legally constitutes prior art.

BRIEF SUMMARY OF THE INVENTION

Disclosed herein is a multi-layer container usable in plastics packaging for food and beverages. The multi-layer container comprises an outer layer and an inner layer, each including a polymeric resin, and a middle layer.

Further disclosed is a method of using a multi-layer container described herein.

Various objects and advantages of this invention will become apparent to those skilled in the art from the following detailed description of the preferred embodiment, when read in light of the accompanying drawings.

BRIEF DESCRIPTION OF THE DRAWINGS

FIG. 12 is a table showing the data shown in FIG. 11A and FIG. 11B as a function of time, showing a total BB-10™ component concentration in the container sidewall and the absorption capacity (cc/g of BB-10™ component).

FIG. 16 is a table summarizing the effect of the outer layer permeation rate on the headspace oxygen absorption for the data shown in FIGS. 13A-13B, 14A-14B, and 15A-15B.

FIG. 23 is table summarizing the data of FIGS. 18A-18B, FIGS. 19A-19B, FIGS. 20A-20B, FIGS. 21A-21B and FIGS. 22A-22B showing the effect of varying the scavenging component-to-catalyst concentrate ratio on the oxygen absorption, where data was gathered from each container beginning after two different storage times.

FIG. 27 is a table summarizing the data of FIGS. 24A-24B, FIGS. 25A-25B and FIGS. 26A-26B, showing the effect of varying the scavenging polymer-to-catalyst concentrate ratio on the transition time of positive oxygen permeation to negative oxygen permeation for a multi-layer container having the layers.

DETAILED DESCRIPTION OF THE INVENTION

Figure 1:
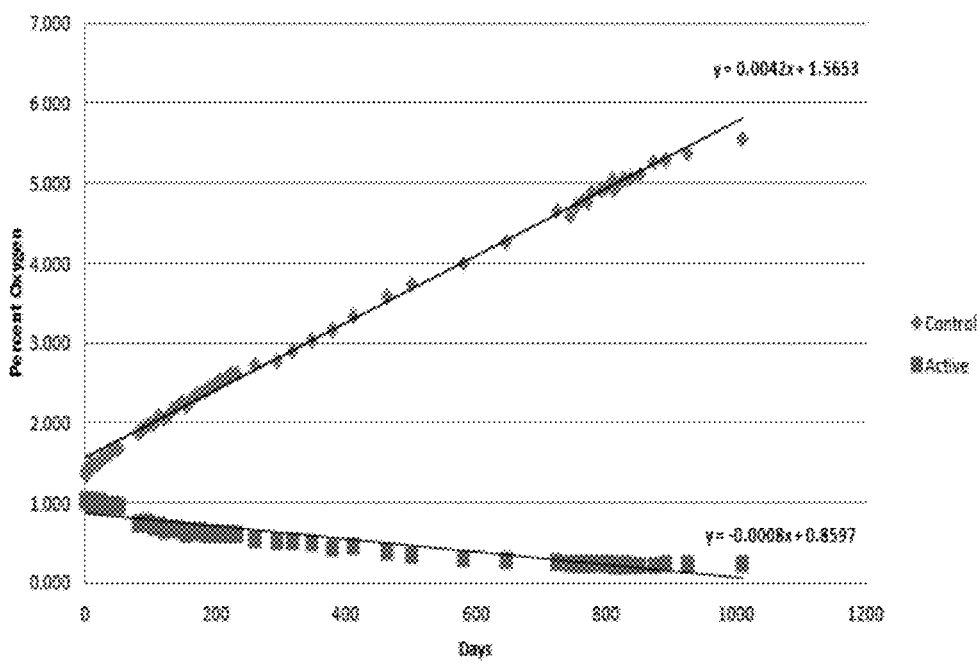
FIG. 1 is a graph showing oxygen ingress into empty containers over time. The graph shows negative oxygen permeation of an empty multilayer container comprised of 60% CPET/20%(10% BB-10™+90% Merge™)/20% APET, compared to linearly increasing oxygen permeation in a control container.

Described herein is an oxygen-scavenging multi-layer container or articles for use in the plastics packaging industry.

In certain embodiments, the multi-layer container has zero oxygen permeation for more than three years. In addition, the composition of the multi-layer container allows the multi-layer container to reduce headspace oxygen after being sealed. Also, described herein is a method of controlling the incubation period of the multi-layer container's oxygen scavenging activity.

As used herein, "polymer" may be used to refer to homopolymers, copolymers, interpolymers, etc. Likewise, a "copolymer" may refer to a polymer comprising two monomers or to a polymer comprising three or more monomers.

As used herein, "middle" or "intermediate" is defined as the position of one layer of a multi-layer article wherein such layer lies between two other identified layers. In certain embodiments, the intermediate layer may be in direct contact with either or both of the two identified layers (e.g., outer layer and inner layer). In other embodiments, one or more additional layers may also be present between the intermediate layer and either or both of the two identified layers.

As used herein, the middle, or active, layer includes at least one oxygen scavenging component and at least one catalyst-containing concentrate. It is to be understood herein that the terms "middle layer," "intermediate" and "active layer" may be used interchangeably, and further that the "middle layer" while generally understood to be interposed between an outermost layer and at an innermost layer, such "middle layer" need not necessarily be exactly centered between the outer layer and the inner layer. That is, in multi-layer containers that contain an even number of layers, the middle layer may be positioned either closer to the outer layer, or to the inner layer, depending on the end-use requirements of the multi-layer container.

Any of the layers in the multi-layer container may comprise a plurality of polymeric resins and may include any of several additives, and numerous embodiments of the multi-layer container are disclosed herein. In addition, several characteristics of the multi-layer container are controllable by adjusting the thickness ratio of the layers, the total concentration of at least one oxygen scavenging component, the ratio of scavenging component to a catalyst-containing concentrate and/or the identity of specific resins in each layer.

In a broad aspect, the multi-layer container is a modified, or active, polymeric resin container. The container comprises an outer layer, a middle layer, and an inner layer. In certain embodiments, the middle layer is generally not thicker than either of the outer or inner layers. In one embodiment, the thickness of the layers, from outer to inner, is in a 60:20:20 ratio. Other thickness ratios are possible. For example, the layers may be in a 40:20:40 thickness ratio, a 60:13:27 thickness ratio, or a 60:10:30 thickness ratio. In certain embodiments, the multi-layer container disclosed herein has a total sidewall thickness (meaning the thicknesses of each layer combined) of about 10 mils to about 30 mils, though other thicknesses are possible.

The outer layer and inner layer are each comprised of a polymeric resin. Either layer may comprise a single resin or a blend of multiple resins. Suitable resins for use in the inner or outer layers are PET, PP, EVOH, high-density polyethylene (HDPE), polyvinyl chloride (PVC), low-density polyethylene (LDPE), polystyrene (PS), acrylic, nylon, polycarbonate, polylactic acid, acrylonitrile butadiene styrene (ABS), or mixtures thereof. In certain embodiments, the polymeric resin is crystalline PET (CPET). In one embodiment, referred to herein as a CPET multi-layer container, the outer layer comprises CPET and the inner layer comprises APET.

The middle, or active, layer of the multi-layer container includes at least one oxygen-scavenging component (also referred to herein as "scavenging polymer" and "scavenging component") and at least one catalyst-containing concentrate. The scavenging component and catalyst-containing concentrate are blended together in a desired ratio to form the middle layer. The scavenging component is present in a concentration ranging from about 1% to about 50%, by weight, of the total container. In certain embodiments, the scavenging component is present in a concentration ranging from about 1% to about 10%, by weight, of the total container. As the examples below demonstrate, the amount of oxygen absorbed by the multi-layer container is determined by the total amount of the scavenging component in the multi-payer container.

In another aspect, provided herein is a method of increasing the absorption of oxygen by a multi-layer container, the method comprising increasing the concentration of scavenging component present in the middle layer.

In a particular embodiment, the multi-layer container comprising an outer layer, an inner layer, and at least one middle layer interposed therebetween; the middle layer including a blend of: i) at least one oxygen-scavenging component, and ii) at least one catalyst-containing concentrate; wherein middle layer contains at least one catalyst transition metal up to about 3% by weight of the multi-layer container.

In certain embodiments, the catalyst-containing concentrate includes one or more oxidation catalysts.

In certain embodiments, the catalyst-containing concentrate depends on the makeup of the scavenging component.

In certain embodiment, the catalyst-containing concentrate depends on the ability to co-process (e.g. co-extrusion or co-injection) with the scavenging component.

In certain embodiments, the catalyst-containing concentrate includes a transition metal selected from cobalt, copper, rhodium, ruthenium, palladium, tungsten, osmium, cadmium, silver, tantalum, hafnium, vanadium, titanium, chromium, nickel, zinc, and manganese.

In certain embodiments, the catalyst-containing concentrate includes a transition metal in the form of a salt.

In certain embodiments, the catalyst-containing concentrate includes a transition metal in the form of a salt, and wherein counter ions for the metal include one or more of carboxylates, including neodecanoates, octanoates, stearates, acetates, naphthalates, lactates, maleates, acetylacetonates, linoleates, oleates, palminates, and 2-ethyl hexanoates; oxides; borides; carbonates; chlorides; dioxides; hydroxides; nitrates; phosphates; sulfates; and, silicates.

In certain embodiments, the catalyst-containing concentrate includes at least one of cobalt stearate or cobalt acetate that is present in a total concentration not exceeding about 3%, by weight, of the multi-layer container.

In certain embodiments, catalyst-containing concentrate is comprised of an oxidation catalyst blended with a polymeric resin.

In certain embodiments, a ratio of oxygen-scavenging component to catalyst-containing concentrate is about 5:95.

In certain embodiments, a ratio of oxygen-scavenging component to catalyst-containing concentrate is about 10:90.

In certain embodiments, a ratio of oxygen-scavenging component to catalyst-containing concentrate is about 20:80.

In certain embodiments, a ratio of oxygen-scavenging component to catalyst-containing concentrate is about 30:70.

In certain embodiments, a ratio of oxygen-scavenging component to catalyst-containing concentrate is about 40:60.

In certain embodiments, a ratio of oxygen-scavenging component to catalyst-containing concentrate is about 50:50.

In certain embodiments, a ratio of oxygen-scavenging component to catalyst-containing concentrate is about 60:40.

In certain embodiments, a total concentration of oxygen-scavenging component in the middle layer is at least about 10%, by weight, of the multi-layer container.

In certain embodiments, a total concentration of oxygen-scavenging component in the middle layer is at least about 5%, by weight, of the multi-layer container In certain embodiments, a total concentration of oxygen-scavenging component in the middle layer is at least about 3%, by weight, of the multi-layer container.

In certain embodiments, a total concentration of oxygen-scavenging component in the middle layer is at least about 2%, by weight, of the multi-layer container.

In certain embodiments, a total concentration of oxygen-scavenging component in the middle layer is at least about 1%, by weight, of the multi-layer container.

In certain embodiments, the outer layer of the multi-layer container has an oxygen permeation rate of no greater than about 3 cc $O_2$/100 in$^2$·day·atm.

In certain embodiments, the outer layer of the multi-layer container has an oxygen permeation rate of no greater than about 2 cc $O_2$/100 in$^2$·day·atm.

In certain embodiments, the outer layer of the multi-layer container has an oxygen permeation rate of no greater than about 1.5 cc $O_2$/100 in$^2$·day·atm.

In certain embodiments, the outer layer of the multi-layer container has an oxygen permeation rate of no greater than about 1 cc $O_2$/100 in$^2$·day·atm.

In certain embodiments, the outer layer of the multi-layer container has an oxygen permeation rate of no greater than about 0.5 cc $O_2$/100 in$^2$·day·atm.

In certain embodiments, the outer layer of the multi-layer container has an oxygen permeation rate of no greater than about 0 cc $O_2$/100 in$^2$·day·atm.

In certain embodiments, the outer layer of the multi-layer container has an oxygen permeation rate of less than about 0 cc $O_2$/100 in$^2$·day·atm.

In certain embodiments, the multi-layer container has an oxygen headspace absorption effect of about 0 cc $O_2$ ingress after about 5 days.

In certain embodiments, the multi-layer container has an oxygen headspace absorption effect of less than about 0 cc $O_2$ ingress after about 5 days.

In certain embodiments, the multi-layer container has an oxygen headspace absorption effect of more than about 0.3% headspace oxygen reduction after about 20 days.

In certain embodiments, the multi-layer container has an oxygen absorption effect of that increases over time after about 5 days after manufacturing of the multi-layer container.

In certain embodiments, the middle layer has an oxygen-scavenging component to catalyst-containing concentrate ratio of greater than about 0.05.

In certain embodiments, substantially no adhesive material is interposed between the middle layer and the outer layer and/or the middle layer and the inner layer.

In certain embodiments, a multi-layer container comprises an outer layer, an inner layer, and at least one middle layer interposed therebetween; the middle layer including a blend of: i) at least one oxygen-scavenging component, and ii) at least one catalyst-containing concentrate; wherein middle layer contains at least one catalyst transition metal up to about 3%, by weight, of the multi-layer container; the multi-layer container having: i) a ratio of oxygen-scavenging component to catalyst-containing concentrate of about 5:95; ii) a total concentration of oxygen-scavenging component in the middle layer of at least about 1%, by weight, of the multi-layer container; iii) an oxygen permeation rate of the outer layer no greater than about 3 cc $O_2$/100 in$^2$·day·atm; iv) an oxygen headspace absorption effect of about 0 cc $O_2$ ingress after about 5 days; and v) an oxygen absorption effect of that increases over time after about 5 days after manufacturing of the multi-layer container.

Also described herein is a method of making the multi-layer container, comprising: providing a middle layer including a blend of: i) at least one oxygen-scavenging component; and, ii) at least one catalyst-containing concentrate that contains at least one catalyst transition metal up to about 3%, by weight, of the multi-layer container; and, interposing the middle layer between at least one outer layer and at least one inner layer without the use of an adhesive material.

In certain embodiments, at least one of the outer layer and the inner layer is comprised of an amorphous poly(ethylene terephthalate) polymer (APET).

In certain embodiments, both the outer layer and the inner layer are comprised of an amorphous poly(ethylene terephthalate) polymer (APET).

In certain embodiments, at least one of the inner layer and the outer layer is comprised of APET, and the blend of the oxygen-scavenging polymer and the catalyst-containing concentrate is present in the middle layer at about a 50:50 ratio.

In certain embodiments, at least one of the inner layer and the outer layer is comprised of APET, and the blend of the one oxygen-scavenging polymer and the catalyst-containing concentrate is present in the middle layer at about a 50:50 ratio; and wherein the middle layer has a thickness of about 0.5 mil.

In certain embodiments, at least one of the inner layer and the outer layer is comprised of APET, the blend of the one oxygen-scavenging polymer and the catalyst-containing concentrate is present in the middle layer at about a 50:50 ratio; and, the multi-layer container having an oxygen absorption of about 50 cc $O_2$, per gram of oxygen-scavenging polymer, present in the multi-layer container.

In certain embodiments, at least one of the outer layer and the inner layer is comprised of an amorphous poly(ethylene terephthalate) polymer (APET), and the outer layer has a thickness of about 1 mil or more.

In certain embodiments, at least one of the outer layer and the inner layer is comprised of an amorphous poly(ethylene terephthalate) polymer (APET), and the oxygen-scavenging polymer in the middle layer is present at least about 0.5%, by weight, of the multi-layer container.

In certain embodiments, at least one of the outer layer and the inner layer is comprised of an amorphous poly(ethylene terephthalate) polymer (APET), and the oxygen-scavenging component to catalyst-containing concentrate in the middle layer is present at least about 1%, by weight, of the multi-layer container.

In certain embodiments, at least one of the outer layer and the inner layer is comprised of an amorphous poly(ethylene terephthalate) polymer (APET), and the oxygen-scavenging polymer in the middle layer is present at least about 2%, by weight, of the multi-layer container.

In certain embodiments, at least one of the outer layer and the inner layer is comprised of an amorphous poly(ethylene terephthalate) polymer (APET), and the oxygen-scavenging component polymer in the middle layer is present at least about 2%, by weight, of the multi-layer container.

In certain embodiments, at least one of the outer layer and the inner layer is comprised of an amorphous poly(ethylene terephthalate) polymer (APET), and a ratio of the oxygen-scavenging component present to catalyst-containing concentrate in the middle layer is about a 5:95 ratio.

In certain embodiments, at least one of the outer layer and the inner layer is comprised of an amorphous poly(ethylene terephthalate) polymer (APET), and the oxygen-scavenging component present at least about 2% or greater, by weight, of the multi-layer container.

In certain embodiments, at least one of the outer layer and the inner layer is comprised of an amorphous poly(ethylene terephthalate) polymer (APET), and the multi-layer container has an oxygen absorption of at least about 50 cc $O_2$, per gram of oxygen-scavenging component.

Oxygen Scavenger Component

In one non-limiting example, the oxygen scavenger component generally comprises a copolyester ether having a polyether segment comprising a poly(tetramethylene-co-alkylene ether), where the alkylene is selected from the group consisting of ethylene, propylene and butylene. The molecular weight of the polyether segment can be in the range of from about 200 g/mole to about 5,000 g/mole. The copolyester ether can contain the polyether segment in a range of from about 15%, by weight, to about 95%, by weight. The copolyester ether further comprises a poly(alkylene oxide)glycol selected from the group including poly(ethylene oxide)glycol, poly(trimethylene oxide)glycol, poly(tetramethylene oxide)glycol, poly(pentamethylene oxide)glycol, poly(hexamethylene oxide)glycol, poly(heptamethylene oxide)glycol, poly(octamethylene oxide)glycol, and poly(alkylene oxide)glycols derived from cyclic ether monomers where the alkylene is selected from the group including ethylene, propylene and butylene. The mole percent of alkylene oxide in the polyether segment can be in the range of from about 20 mole percent to about 75 mole percent.

In one embodiment, the two-component formulation may comprise of a catalyst-containing concentrate and an oxygen-scavenging resin sold under the trademark OxyClear® manufactured by Auriga Polymers Inc., 4235 South Stream Blvd., Charlotte, N.C. 28217. In certain embodiments, the catalyst-containing concentrate is referred to herein as "Merge" or "Merge 2310™" and the oxygen scavenging component is referred to herein as "BB-10™" or "Merge 3500™" which are manufactured by Auriga Polymers, Inc.

In certain embodiments where the particular embodiments where a BB-10™ component is at least part of the oxygen scavenging component, the BB-10® component can be present in a total concentration of at least about 1.0%, by weight, of the multi-layer container. Also, in certain embodiments where the BB-10™ component is the oxygen scavenging component, the multi-layer container does not comprise a reducing sulfite salt or an oxidizable metal such as iron, zinc, copper, aluminum, or tin. In certain embodiments where BB-10™ component is at least part of the oxygen scavenging component, the multi-layer container does not comprise an electrolyte component. In certain embodiments where BB-10™ component is at least part of the oxygen scavenging component, the multi-layer container does not comprise a water-absorbent binder.

It is to be understood that, in other embodiment, other scavenging components may be used. For instance, the scavenging component may include a partially aromatic polyamide with a copolyester comprising a metal sulfonate salt. Also, in certain other embodiments, suitable oxygen scavenger components can include oxidizable polymers.

Catalyst-Containing Concentrates

In certain embodiments, the catalyst-containing concentrate may comprise one or more suitable oxidation catalysts. Also, in certain embodiments, the particular catalyst-containing concentrate that is useful in the multi-layer container can be varied, depending on the particular oxygen scavenging component that is used. In particular embodiments, the oxidation catalyst generally comprises a transition metal selected from cobalt, copper, rhodium, ruthenium, palladium, tungsten, osmium, cadmium, silver, tantalum, hafnium, vanadium, titanium, chromium, nickel, zinc, and manganese. The metal may be in the form of a salt. Suitable counter ions for the metal may include carboxylates (such as neodecanoates, octanoates, stearates, acetates, naphthalates, lactates, maleates, acetylacetonates, linoleates, oleates, palminates, or 2-ethyl hexanoates), oxides, borides, carbonates, chlorides, dioxides, hydroxides, nitrates, phosphates, sulfates and silicates. In particular embodiments, the oxidation catalyst comprises cobalt stearate or cobalt acetate. In a particular embodiment, the oxidation catalyst (such as cobalt stearate or cobalt acetate) is present in a total concentration not exceeding 3%, by weight, of the multi-layer container.

It is to be understood that the oxidation catalyst is generally blended with a polymeric resin in order to form the catalyst-containing concentrate. In certain embodiments, the polymeric resin is compatible with both the outer CPET layer and the inner layer such that no adhesive material is needed when forming the multi-layer container.

In one embodiment, the catalyst-containing concentrate can be a material sold under the trade names Merge and Merge-2310 manufactured by Auriga Polymers, Inc.

Method of Forming "Active or Middle," Layers

In one method for forming the middle layer, the oxygen scavenging component and the catalyst-component concentrate are blended together in an extruder. No triggering agent is necessary to begin oxygen scavenging. The oxygen scavenger component and the catalyst-containing concentrate may be blended with one or more additional polymeric resins to form an active layer for the oxygen-scavenging multi-layer containers. Suitable additional resins include CPET, APET, PP, EVOH, HDPE, PVC, LDPE, PS, acrylic, nylon, polycarbonate, polylactic acid, ABS, or mixtures thereof. In embodiments where the oxygen scavenger component and the catalyst-containing concentrate are not blended with additional resins, the middle layer has an oxygen scavenger component-to-catalyst-containing concentrate ratio ranging from about 1:99, 5:95, 10:90, 15:85, 20:80, 25:75, 30:70, 35:60, 40:60, 50:50, 55:45, 60:40. 65:35, 70:30, 75:30, 80:20, percent, by weight, of the middle layer. In particular examples stated herein, the ratio is about 5:95, 10:90, 20:80, 25:75, 30:70, 33:67, 40:60, or 50:50 percent, by weight, of the middle layer. Other scavenging component-to-concentrate ratios are possible; however, in certain embodiments, the multi-layer containers disclosed herein has a scavenging component-to-concentrate ratio of at least 2:98 percent, by weight, of the middle layer.

In addition, any of the layers (outer, middle and/or inner) in the multi-layer container may comprise additional additives. Examples of such possible additives are dyes, pigments, fillers, branching agents, reheat agents, anti-blocking agents, anti-oxidants, anti-static agents, biocides, blowing agents, coupling agents, flame retardants, heat stabilizers, impact modifiers, UV and visible light stabilizers, crystallization aids, lubricants, plasticizers, drying agents, processing aids, acetaldehydes or other scavengers, and slip agents, or mixtures thereof. Other additives are possible. In addition, any of the layers in the container, including the layer comprising the scavenging component and the catalyst-containing concentrate, may be foamed. Any suitable polymeric foaming technique, such as bead foaming or extrusion foaming, can be utilized to accomplish the foaming. A foamed resin layer can be adhered to a solid resin layer by a suitable method. Also, any of the layers may further comprise a passive barrier such as a metalized polyolefin, a silica-coated polyester, or aluminum foil. Further, any layer may comprise an anti-microbial agent to help preserve foods, or silicone to prevent sticking during processing.

Methods of Making Multilayer Containers (or Articles)

To manufacture the multi-layer container disclosed herein, the layers are blended together at the desired thickness of each layer into a multi-layered material, such as a film, sheet, or preform, through, for example, coextrusion, coinjection, coating or lamination. The multi-layered material is then stretch blow molded, "melt-to-mold" or thermoformed into a multi-layer container or other fabricated article using either single-stage or multi-stage blow molding or single-stage or multi-stage thermoforming.

Also described herein is a method of producing an oxygen-scavenging multi-layer container. The method includes the steps of producing an active layer by blending at least one oxygen-scavenging component with at least one catalyst-containing concentrate at a specific ratio and extruding the active layer. The active layer can be extruded adjacent one or more other polymeric resins to form a multi-layer container. In certain embodiments, the multi-layer container can be formed by a suitable process (such as, but not limited to thermoforming, stretch blow molding and melt-to-mold processing). In general, the melt-to-mold process, a molten, crystallizable polyester composition film is thermoformed and crystallized by cooling to a temperature between the polyester Tg and the polyester Tm. In general, thermoforming includes the step of pulling a plastic sheet from a roll over a die or mold of the object to be formed, then sealing the sheet along the periphery of the mold. The plastic sheet is then heated to render it pliable, and pressure is applied to the sheet forcing the sheet into the mold. Alternatively a vacuum is drawn from below the sheet evacuating the air in the space between the mold surface and the sheet surface thereby drawing the surface of the sheet into the shape of the mold. Additionally, pressure and vacuum can be used together to form the article. When the heated sheet is expanded into and held against the contours of the mold and allowed to cool, the sheet retains the details of the mold upon removal.

Further disclosed herein is a method of controlling the oxygen scavenging incubation period of a multi-layer container. The method involves adjusting the scavenging component-to-concentrate ratio in the active layer of a multi-layer container.

Examples of suitable other fabricated articles in addition to multi-layer containers include, but are not limited to, films, sheets, tubing, pipes, fibers, thermoformed articles, or flexible bags. The multi-layer articles can also be used on as layers, coatings, bottle cap liners, sheet inserts, gaskets, sealants, and the like.

Non-limiting examples of products which can be packaged in such multi-layer containers include not only food and beverage, but also other oxygen sensitive materials such as pharmaceuticals, medical products, corrodible metals or products such as electronic devices, and the like.

It is also to be understood that in most embodiments, the multi-layer container made by this process does not need an external triggering mechanism such as ultraviolet light or water in order to begin oxygen scavenging.

Crystalline Poly(Ethylene Terephthalate) (CPET)

In certain embodiments, at least one of the outer and/or inner layers of the multi-layer contain is comprised of a crystalline poly(ethylene terephthalate) CPET polymer material. In many cases, CPET multi-layer containers, and articles made therefrom, are opaque because of the crystallinity of the polymer. Also due to the crystallinity, CPET multi-layer containers have high heat resistance, are suitable for retort sterilization at temperatures as high as desired, such as 260° F. or higher, and can be used in microwave ovens or conventional ovens (400° F.).

In addition, CPET multi-layer containers are also suitable for use in hot fill sterilization processes (185-194° F.) and other sterilization processes. By contrast, embodiments comprising APET in both the inner and outer layer are glass-clear but have low heat resistance. CPET is also less subject to deformation under stress than APET. A variety of fabricated multi-layer containers comprising both CPET and APET is possible due to the variability of suitable materials, concentrations, and thicknesses. For example, in certain embodiments, a multi-layer container comprises CPET in the outer layer, APET in the inner layer, and has a total thickness of about 10 mils to about 30 mils with a layer thickness ratio from outer to inner of any of 60:20:20, 60:13:27, 60:15:25, 60:10:30, 40:20:40, or 20:20:60. Effectively, the multi-layer container disclosed herein comprising CPET is a high-heat oxygen barrier.

In certain embodiments, the synthesis of CPET starts with either an esterification reaction between terephthalic acid and ethylene, or a transesterification reaction between ethylene glycol and dimethyl terephthalate. The monomer product is then polymerized into PET through a condensation process with either water or methanol as the byproduct. Once polymerized, the PET material is crystallized. In one method, the PET material is submerged in water, heated to an elevated temperature known as the glass transition temperature, and not quenched rapidly. This causes the polymer to turn opaque due to the formation of crystallized aggregates of un-oriented polymer. Crystallization of the heated PET material can also be stress-induced. If heated PET material is dried too rapidly, however, it emerges in an amorphous state as APET.

One feature of the multi-layer container described herein is that the multi-layer container's incubation period before oxygen absorption begins can be adjusted by altering the composition of the middle layer, or active layer, that contains the scavenging component and catalyst-containing concentrate.

It is to be noted that, for particular embodiments, the incubation period can be lengthened or shortened by varying the ratio of scavenging component to catalyst-containing concentrate in the middle layer. That is, the less amount of catalyst present in the middle layer, the longer the incubation time of the multi-layer container's oxygen scavenging. As an example, a multi-layer container having a layer thickness ratio of 60:20:20 with CPET in the outer layer, APET in the inner layer, and a scavenging component-to-concentrate ratio of 20:80 percent by weight of the middle layer, begins to absorb oxygen without a notable incubation period. An otherwise identical multi-layer container having a scavenging component-to-concentrate ratio of 40:60 percent by weight of the middle layer begins to absorb oxygen after an incubation period of about 50 days.

In certain embodiments, to ensure that the container does not scavenge during inventory (i.e., before being used by the food manufacturer), the scavenging component-to-concentrate ratio can be in the range of about 2-to-about-98. Thus, disclosed herein is a method of controlling the incubation period of an oxygen-scavenging multi-layer container, where the method does not need to rely on the use of water or ammonium salts.

Various articles, such as packaging containers for food or beverages, can be fabricated from the multi-layer container. These articles can have negative oxygen permeation for up to three years and can have customized incubation periods adjusted for the approximate amount of time between production of the multi-layer containers and filling of the multilayer containers. For example, a multi-layer container that will sit for 50 days in a warehouse before being filled could be made to have a 50-day incubation period, as explained above. This way, the multi-layer containers can be kept inactive during inventory, thereby reducing the amount of oxygen scavenger necessary. In addition, the articles do not need adhesive and do not show delamination.

In certain embodiments where the cost of the scavenging component is high, it is desired to maximize the oxygen absorption capacity per gram of the scavenging component. In certain non-limiting embodiments, where the BB-10™ component is at least a part of the scavenging component, an oxygen absorption capacity of 50 cc per gram of BB-10™ component is desirable. As the examples below demonstrate, increasing the concentration of scavenging component in the middle layer results in an increase in the oxygen absorption capacity per gram of scavenging component. For example, where oxygen absorption of 55 cc per gram of BB-10™ component is accomplished, the BB-10™ component is present at least about 5%, by weight, of the middle layer.

Further disclosed herein is a method of reducing the headspace oxygen of a multi-layer container. If the oxygen absorption rate is quicker than the oxygen permeation rate through the outer layer, then the container's headspace oxygen becomes even lower than the original value at the time of filling. Headspace oxygen reduction is desirable because such reduction may eliminate the costly practice of gas flushing the headspace after filling the container with product.

In certain non-limiting embodiments where the scavenging component is the BB-10™ component, the oxygen permeation rate through the outer layer is less than 2 cc/100 in$^2$·day·atm, which provides a desirable reduction in headspace oxygen. In one particular embodiment, a multi-layer container includes at least: an outer layer comprising APET at least about 3.6 mils thick, and an outer layer comprising CPET at least about 1.5 mils thick.

The duration of headspace oxygen reduction is a function of the scavenging component concentration. The method of reducing the headspace oxygen of a multi-layer container can include adjusting the thickness of the outer layer, the total amount of the scavenging component, or the concentration of the scavenging component.

EXAMPLES

Certain embodiments of the present invention are defined in the Examples herein. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions.

Some of the following examples reference trial or other identifying numbers. Because many parameters and characteristics of the multi-layer container disclosed herein are customizable, many alternative embodiments of the multi-layer container are possible. A series of 17 multi-layer containers in accordance with the present disclosure were manufactured and tested in a variety of manners in comparison with two control containers and three monolayer containers.

For ease of reference when reading the following examples, the composition of the various embodiments of the multi-layer container, along with the control and monolayer containers, described in the following examples are given below:

Trial #1: 11 mil APET monolayer container, 0% total BB-10® component.
Trial #2: 11 mil monolayer container with 3% BB-10™, 17% Merge™ and 80% APET, 3% total BB-10™ component.
Trial #3: 6.6 mil APET/2.2 mil (15% BB-10™+85% Merge™)/2.2 mil APET, 3% total BB-10™ component.
Trial #4: 4.4 mil APET/2.2 mil (15% BB-10™+85% Merge™)/4.4 mil APET, 3% total BB-10™ component.
Trial #5: 2.2 mil APET/2.2 mil (15% BB-10™+85% Merge™)/6.6 mil APET, 3% total BB-10™ component.
Trial #6: 11 mil monolayer structure with 2% BB-10™, 18% Merge™ and 80% APET, 2% total BB-10™ component.
Trial #7: 6.6 mil APET/2.2 mil (10% BB-10™+90% Merge™)/2.2 mil APET, 2% total BB-10™ component.
Trial #8: 4.4 mil APET/2.2 mil (10% BB-10™+90% Merge™)/4.4 mil APET, 2% total BB-10™ component.
Trial #9: 2.2 mil APET/2.2-mil (10% BB-10™+90% Merge™)/6.6 mil APET, 2% total BB-10™ component.
Trial #10: 11 mil monolayer structure with 1% BB-10™, 19% Merge™ and 80% APET, 1% total BB-10™ component.
Trial #11: 6.6 mil APET/2.2 mil (5% BB-10™+95% Merge™)/2.2 mil APET, 1% total BB-10™ component.
Trial #12: 4.4 mil APET/2.2 mil (5% BB-10™+95% Merge™)/4.4 mil APET, 1% total BB-10™ component.
Trial #13: 2.2 mil APET/2.2 mil (5% BB-10™+95% Merge™)/6.6 mil APET, 1% total BB-10™ component.
Trial #14: 6.6 mil APET/2.2 mil (25% BB-10™+75% Merge™)/2.2 mil APET, 5% total BB-10™ component.
Trial #15: 6.6 mil APET/1.7 mil (33% BB-10+67% Merge™)/2.7 mil APET, 5% total BB-10™ component.
Trial #16: 6.6 mil APET/1.1 mil (50% BB-10™+50% Merge™)/3.3 mil APET, 5% total BB-10™ component.
CPET Control: 20 mil CPET, 0% total BB-10™ component.
10446: 12 mil CPET/4 mil (10% BB-10™+90% Merge™)/4 mil APET, 2% total BB-10™ component.
Oxy 2: 12 mil CPET/2 mil (20% BB-10™+80% Merge™)/6 mil APET, 2% total BB-10™ component.
Oxy 3: 12 mil CPET/4 mil (20% BB-10™+80% Merge™)/4 mil APET, 4% total BB-10™ component.
Oxy 4: 12 mil CPET/2.7 mil (30% BB-10™+70% Merge™)/5.3 mil APET, 4% total BB-10™ component.
Oxy 5: 12 mil CPET/2 mil (40% BB-10™+60% Merge™)/6 mil APET, 4% total BB-10™ component.

Example 1

Oxygen Ingress

A CPET multi-layer container having a volume of 93 cc, a surface area of 15.25 in$^2$, and a sidewall thickness of 20 mils was fabricated and tested side by side with a CPET control container. An OxyDot® oxygen sensor was glued on the clear inner surface of a glass plate inside the containers, and the containers were then sealed. During sealing, the containers were flushed with nitrogen to 1% headspace oxygen.

As shown in FIG. 1, the headspace oxygen of the control container increased after 1,000 days from 1.37% to 5.56%, while that of the CPET multi-layer container decreased from 1.03% to 0.26%. These results clearly demonstrate that the CPET multi-layer container is superior not only to any plastics-based containers, but also to metal cans and glass bottles. A good result was achieved with a very high surface to volume ratio (16.4 in$^2$/100 cc or 15.25 in$^2$/93 cc) multi-layer container having a fairly thin side wall (20 mils).

Example 2

Barrier Properties

A CPET multi-layer container having a volume of 297 cc, a surface area of 35.3 in$^2$, and a sidewall thickness of 19 mils, was filled with about 90% water to have about 10% empty headspace. A SiO$_x$-coated bather lidding film with an Oxy-Dot® oxygen sensor glued on the inner surface was heat-sealed on the container. The same procedure was followed for a CPET control container and a PP/EVOH container, to be tested side by side with the CPET multi-layer container. During water filling, the containers were flushed with nitrogen to 5% headspace oxygen. The containers were then retorted at 260° F. for 45 minutes.

Figure 2:
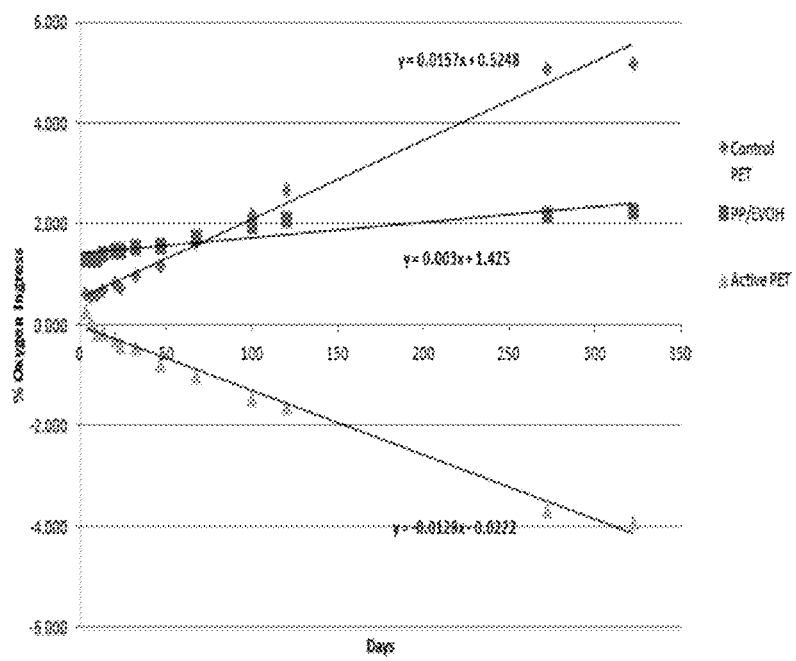
FIG. 2 is a graph displaying barrier properties of retorted, water-filled containers. The graph compares the percent of oxygen ingress over time between a CPET multi-layer container (comprised of 60% CPET/20% (10% BB-10™ component+90% Merge™ component)/20% APET), a control container, and a PP/EVOH container. The containers were retorted at 260° F. for 45 minutes.
Figure 3:
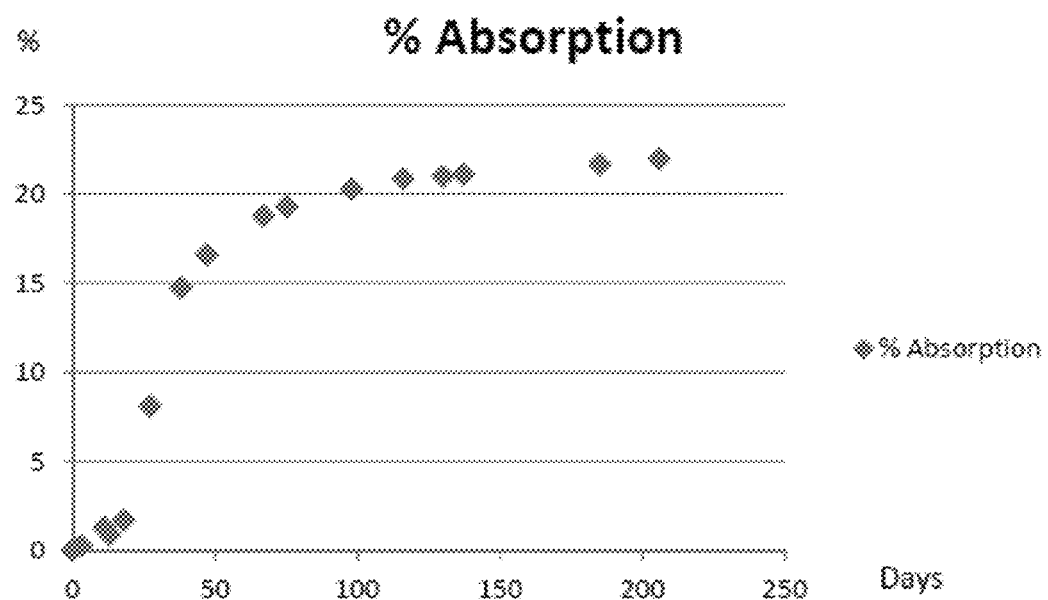
FIG. 3 is a graph showing percent oxygen absorption over time, for a multi-layer container (comprised of 60% CPET/20% (20% BB-10™ component+80% Merge™ component)/20% APET) not designed to have a significant incubation period.
Figure 4:
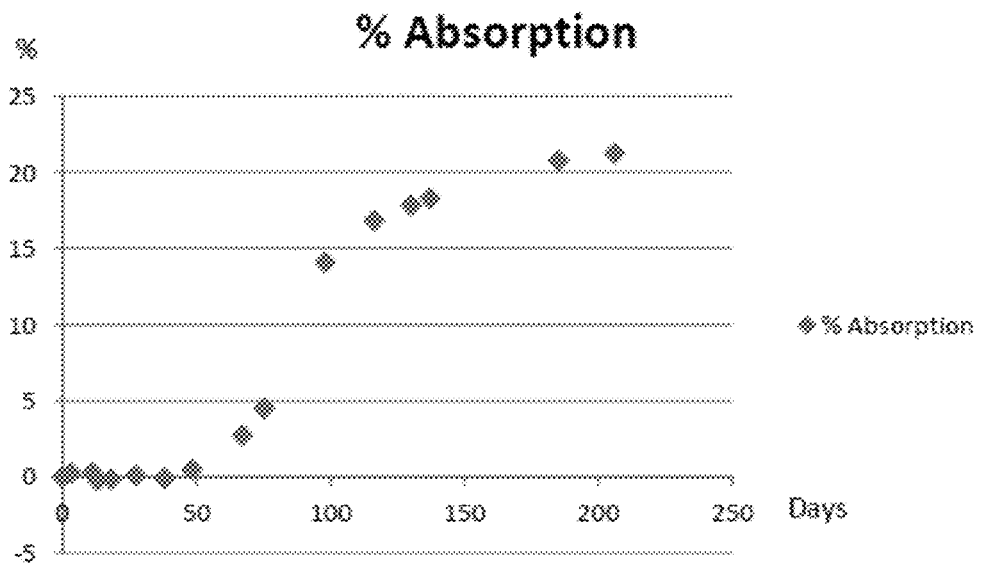
FIG. 4 is a graph showing percent oxygen absorption over time, for a multi-layer container (comprised of 60% CPET/20% (40% BB-10™ component+60% Merge™ component)/20% APET), designed to have an incubation period of about 50 days.
Figures 5A, 5B:
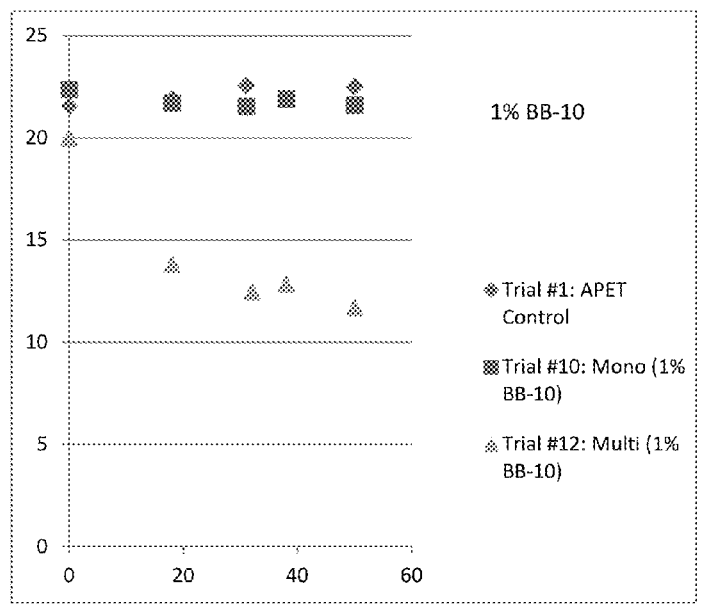
FIG. 5A is a graph showing the effect of the scavenging component absorption of a multi-layer container, an APET control container, and a monolayer container, where the total concentration of scavenging polymer in the multi-layer container and monolayer container is 1%.
FIG. 5B is a table of the data shown in FIG. 5A.
Figures 6A, 6B:
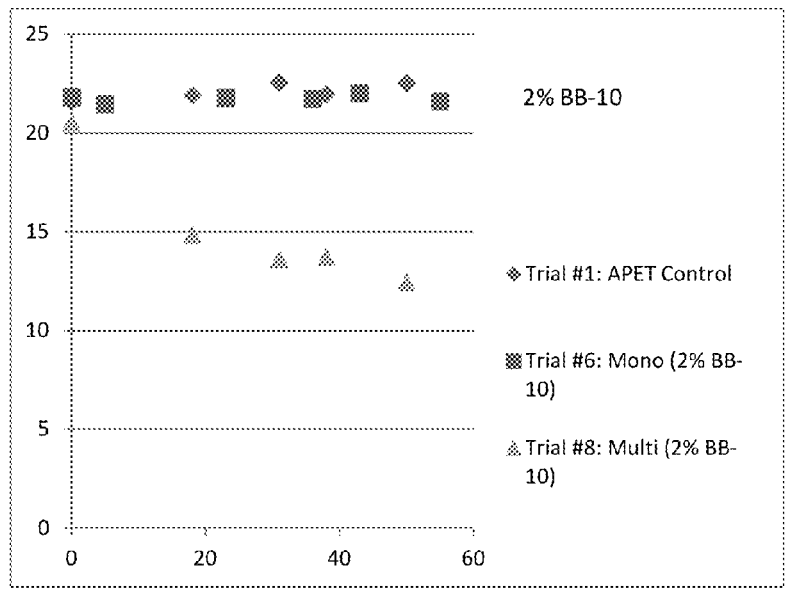
FIG. 6A is a graph showing the oxygen absorption of a multi-layer container, an APET control container, and a monolayer container, where the total concentration of scavenging polymer in the multi-layer container and monolayer container is 2%.
FIG. 6B is a table of the data shown in FIG. 6A.
Figures 7A, 7B:
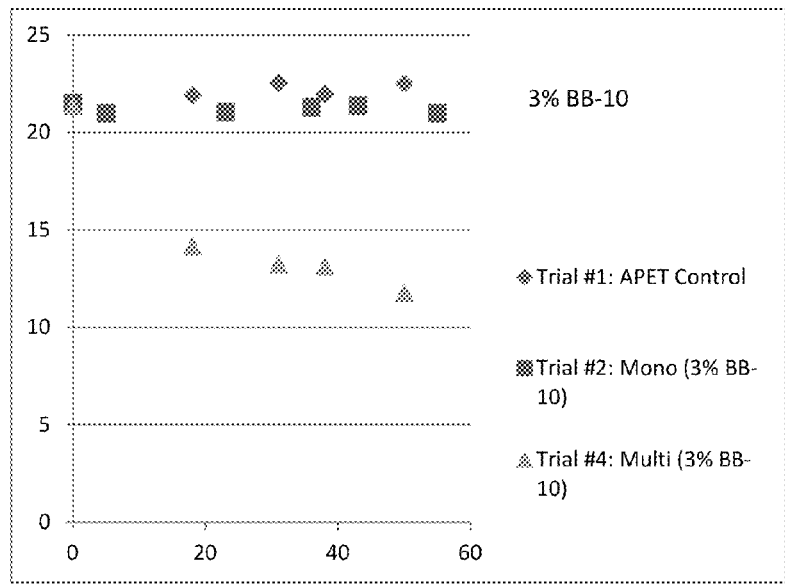
FIG. 7A is a graph showing the oxygen absorption of a multi-layer container, an APET control container, and a monolayer container, where the total concentration of scavenging polymer in the multi-layer container and monolayer container is 3%.
FIG. 7B is a table of the data shown in FIG. 7A.
Figures 8A, 8B:
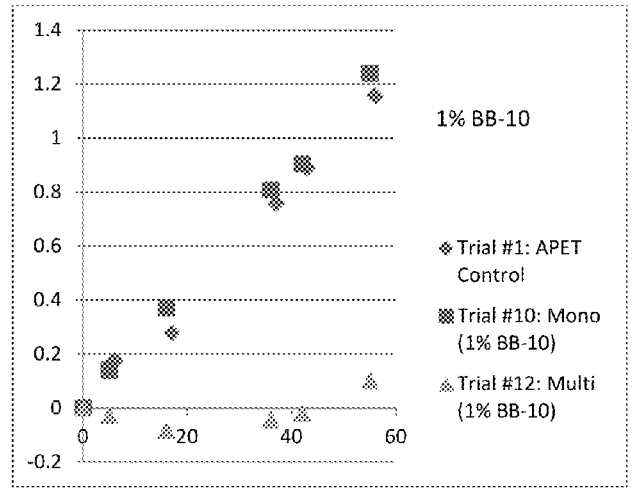
FIG. 8A is a graph showing the oxygen permeation of a multi-layer container, an APET control container, and a monolayer container, where the total concentration of scavenging polymer in the multi-layer container and monolayer container shown is 1%.
FIG. 8B is a table of the data shown in FIG. 8A.
Figures 9A, 9B:
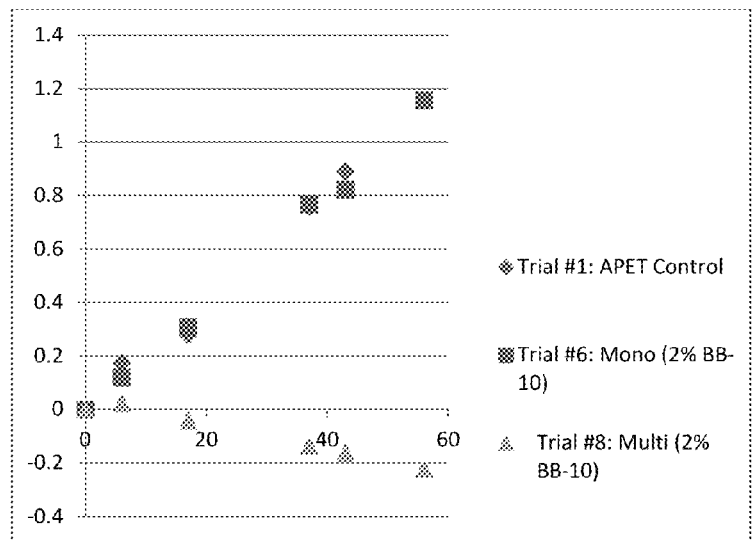
FIG. 9A is a graph showing the oxygen permeation of a multi-layer container, an APET control container, and a monolayer container, where the total concentration of scavenging polymer in the multi-layer container and monolayer container shown is 2%.
FIG. 9B is a table of the data shown in FIG. 9A.
Figures 10A, 10B:
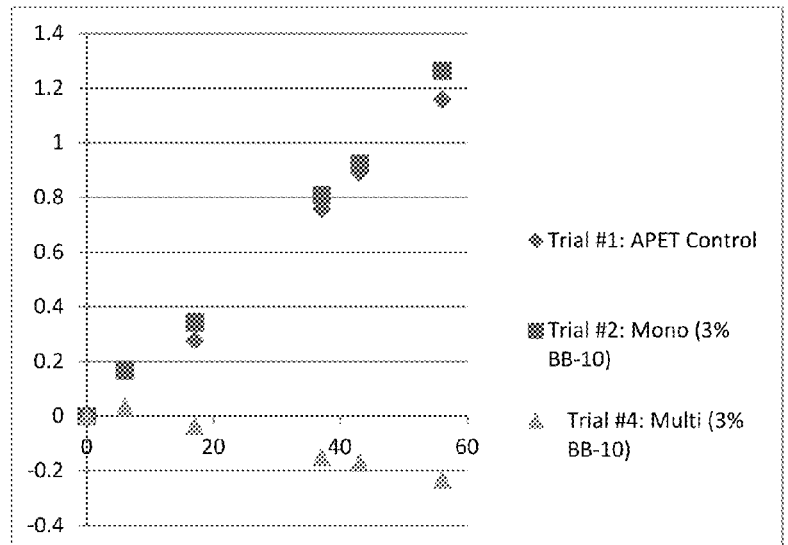
FIG. 10A is a graph showing the oxygen permeation of a multi-layer container, an APET control container, and a monolayer container, where the total concentration of scavenging polymer in the multi-layer container and monolayer container shown is 3%.
FIG. 10B is a table of the data shown in FIG. 10A.

As shown by FIG. 2, the control container and the PP/EVOH container showed a steady increase of oxygen concentration while the CPET multi-layer container showed a steady decrease of oxygen concentration. At day 20, the headspace oxygen change of the PP/EVOH container, the control container, and the CPET multi-layer container was +1.5%, +0.8%, and −0.3%, respectively. The poor oxygen barrier property of the PP/EVOH container shortly after retort is due to the retort shock effect; the retort causes high moisture content in EVOH. As the barrier property of EVOH recovered after about 80 days, the PP/EVOH container had lower oxygen concentration than the control container. At day 320, the headspace oxygen change of the control container, the PP/EVOH container, and the CPET multi-layer container was +5.0%, +2.2%, and −4.0%, respectively. This result clearly demonstrates that the CPET multi-layer container is superior to the commercial PP/EVOH container. Furthermore, the results show the headspace oxygen of the CPET multi-layer container steadily decreases, in contrast to perfect barrier packages such as metal cans or glass bottles, which can only keep the headspace oxygen unchanged.

Example 3

Multi-Layer v Mono Layer

The oxygen absorption of a multi-layer container was compared to that of a monolayer container. The container sidewall was pulverized to fine particles and placed in a sealed glass container. The oxygen concentration inside the glass container was measured periodically by a non-invasive oxygen analyzer sold by Oxysense Inc. The glass container containing an APET control container sample remained at 21% oxygen while the multi-layer container's oxygen absorption was lower.

As seen in FIGS. 5A-5B, FIGS. 6A-6B and FIGS. 7A-7B, the monolayer containers containing BB-10™ component (trials #10, #6 and #2) did not absorb oxygen at all, while the multi-layer containers containing BB-10™ component (trials #12, #8 and #4) absorbed oxygen. While not wishing to be bound by theory, it is now believed by the inventors herein that the host APET polymer in the monolayer container destroys the efficacy of the BB-10™ component/Merge™ component oxygen scavenger completely.

Example 4

Oxygen Permeation

Oxygen permeation was compared between a multi-layer container, an APET control container, and a monolayer container. The containers were sealed with a glass plate in a low oxygen chamber. The initial headspace oxygen inside the containers was about 1-2%. The headspace oxygen concentration was measured periodically by a non-invasive oxygen analyzer sold by Oxysense Inc. to obtain the oxygen permeation rate. The oxygen permeation of the APET control container and the monolayer container increased with time while the multi-layer container's oxygen permeation was far lower, sometimes negative.

As seen in FIGS. 8A-8B, FIGS. 9A-9B and FIGS. 10A-10B, the monolayer container containing BB-10® component (trials #10, #6 and #2) did not absorb oxygen at all while the multi-layer container containing BB-10™ component (trials #12, #8 and #4) absorbed oxygen. The host APET polymer in the monolayer structure destroyed the efficacy of the BB-10™ component/Merge™ component oxygen scavenger completely. By incorporating the BB-10 Component™/Merge™ component oxygen scavenger in a separate layer in the multi-layer container, the oxygen absorption efficacy of the BB-10™ component/Merge™ component oxygen scavenger is preserved.

Example 5

Oxygen Absorption Capacity

The concentration effect on oxygen absorption capacity was determined. The sidewall of each of an APET control container and a multi-layer container was pulverized to fine particles and placed in a sealed glass container. The headspace oxygen of the glass container containing the APET control container sample remained at 21% while that containing the multi-layer container was lower. The percent reduction of the oxygen headspace can be converted to the amount of oxygen absorbed. Since the amount of BB-10™ component in each pulverized sample is known, one can calculate the oxygen absorption capacity (cc/g of BB-10™ component). The steady state values after 130 days are shown in FIG. 11A.

The oxygen absorption capacity of the BB-10™ component/Merge™ component formulation increases with the BB-10™ component concentration in the middle layer. In other words, for the same amount of BB-10™ component, one can increase the efficacy of the BB-10™ component/Merge™ component formulation by concentrating BB-10™ component in a thin layer of a multi-layer structure instead of dispersing BB-10™ component in a thick monolayer structure.

In certain embodiments, since the particular oxygen scavenger BB-10™ component is much more expensive than other components in a plastic container, it is desired to maximize the oxygen absorption capacity while using a lesser amount of the expensive oxygen scavenger component in order to be cost competitive with other barrier systems. In certain embodiments, an oxygen absorption capacity of 50 cc per gram of BB-10™ component is desirable.

Figures 11A, 11B:
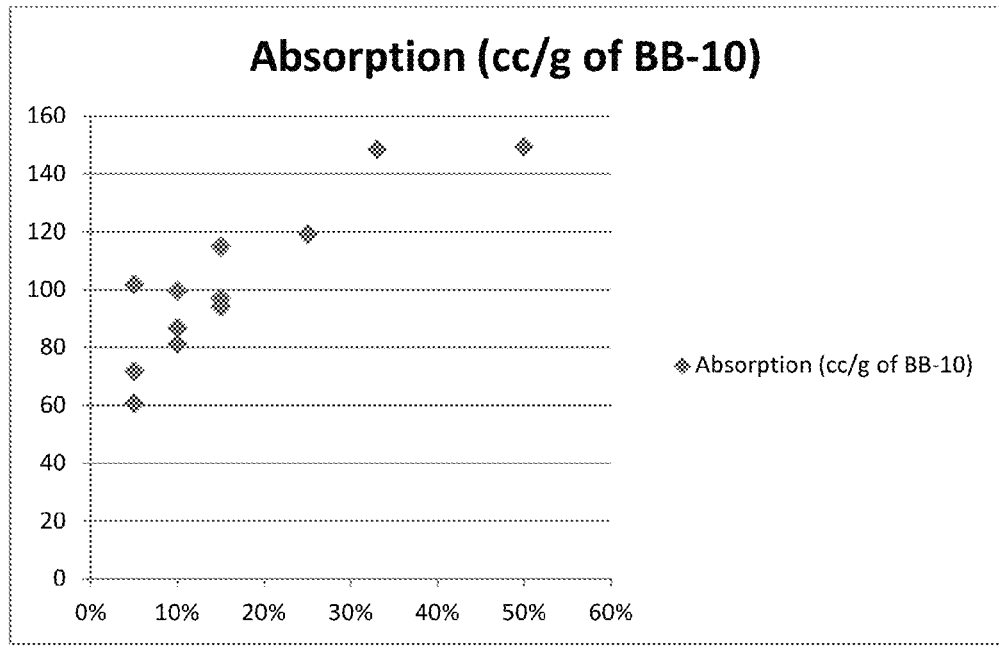
FIG. 11A is a graph showing oxygen absorption as a function of BB-10® component concentration in a middle layer of an APET multi-layer container. Absorption capacity tends to increase as the concentration of BB-10™ component in the middle layer increases.
FIG. 11B is a table of the data shown in FIG. 11A.
Figures 13A, 13B:
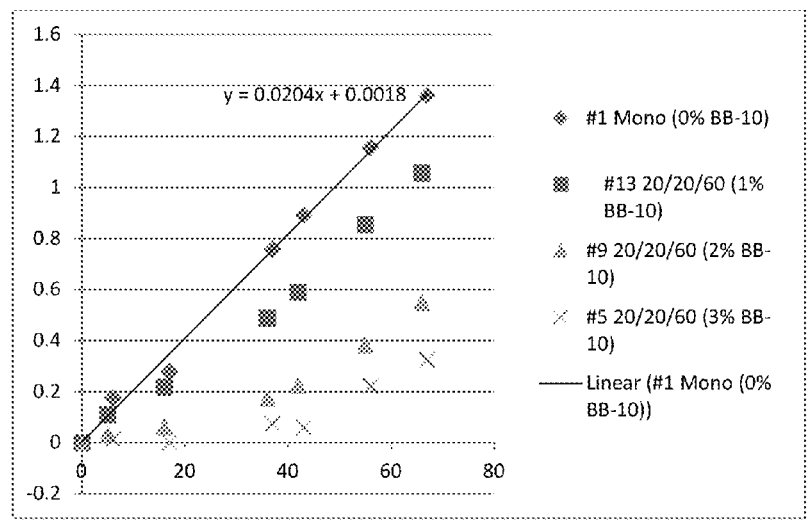
FIG. 13A is a graph showing the effect of layer structure on oxygen permeation, where the thickness of the outer layer in the APET multi-layer containers shown is 2.2 mils.
FIG. 13B is a table of the data shown in FIG. 13A.
Figures 14A, 14B:
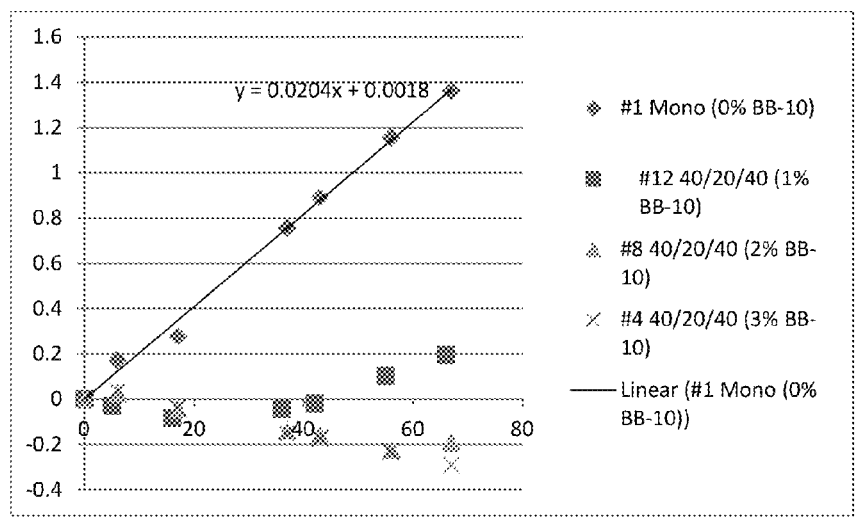
FIG. 14A is a graph showing the effect of layer structure on oxygen permeation, where the thickness of the outer layer in the APET multi-layer containers shown is 4.4 mils.
FIG. 14B is a table of the data shown in FIG. 14A.
Figures 15A, 15B:
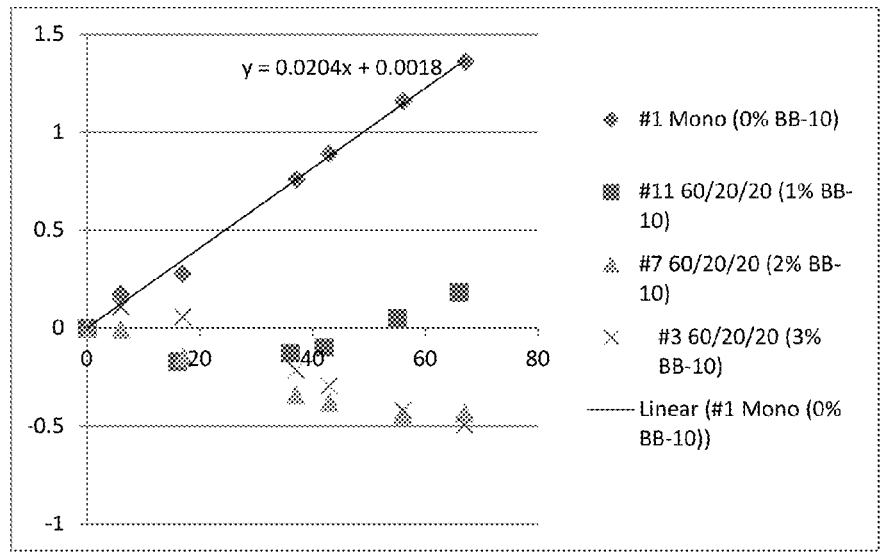
FIG. 15A is a graph showing the effect of layer structure on oxygen permeation, where the thickness of the outer layer in the APET multi-layer containers shown is 6.6 mils.
FIG. 15B is a table of the data shown in FIG. 15A.

FIGS. 11A-11B and FIG. 12, show specific embodiments where the BB-10™ component concentration in the middle layer is higher than 5%, by weight.

Example 6

Headspace Oxygen Absorption

The effect of layer structure on headspace oxygen absorption was determined by measuring oxygen permeation in containers with varying layer structures. The containers were sealed with a glass plate in a low oxygen chamber. The initial headspace oxygen inside the containers was about 1-2%. The headspace oxygen concentration was measured periodically by a non-invasive oxygen analyzer sold by Oxysense Inc. to obtain the oxygen permeation rate. The headspace oxygen of the APET control container increased with time while that of the multi-layer container showed a reduced oxygen permeation rate or even a negative permeation.

As seen in FIGS. 13A-13B, FIGS. 14A-14B and FIGS. 15A-15B, the APET control #1 container did not absorb oxygen at all while the multi-layer containers containing BB-10 Component™/Merge™ component absorbed oxygen. Containers having a 2.2 mil APET outer layer, a 4.4 mil APET outer layer, and a 6.6-mil APET outer layer were also tested.

The effect of the outer layer permeation rate on the headspace oxygen reduction is summarized in the table shown in FIG. 16.

From these results, it is determined that the oxygen permeation rate through the outer layer should be less than 2 cc/100 in$^2$·day·atm for the BB-10™ component/Merge™ component formulation to reduce the headspace oxygen inside a container. Furthermore, the total BB-10™ component concentration is the factor which determines the duration of oxygen headspace absorption (e.g., #4, #8 vs. #12 in FIG. 14 and #3, #7 vs. #11 in FIG. 15). The oxygen permeation rate is a function of material properties and layer thickness. In one embodiment, in order to achieve the 2 cc/100 in$^2$·day·atm requirement, a 3 mil APET outer layer was used, and a 1.5 mil CPET outer layer was sufficient.

Example 7

Scavenging Component/Catalyst Component Ratio in Multilayer Container as Affecting Oxygen Absorption Incubation Time The effect of the scavenging component-to-catalyst concentrate ratio was studied by measuring the oxygen absorption of containers with varying scavenging component-to-catalyst concentrate ratios. The sidewalls of several containers were pulverized into fine particles and placed in a sealed glass container. The oxygen concentration inside the glass container was measured periodically by a non-invasive oxygen analyzer sold by Oxysense Inc. The glass container containing the APET control container sample remained at 21% while that containing the multi-layer container sample was lower. The difference between 21% and that of the multi-layer container is shown in FIGS. 17A-22B.

Figures 17A, 17B:
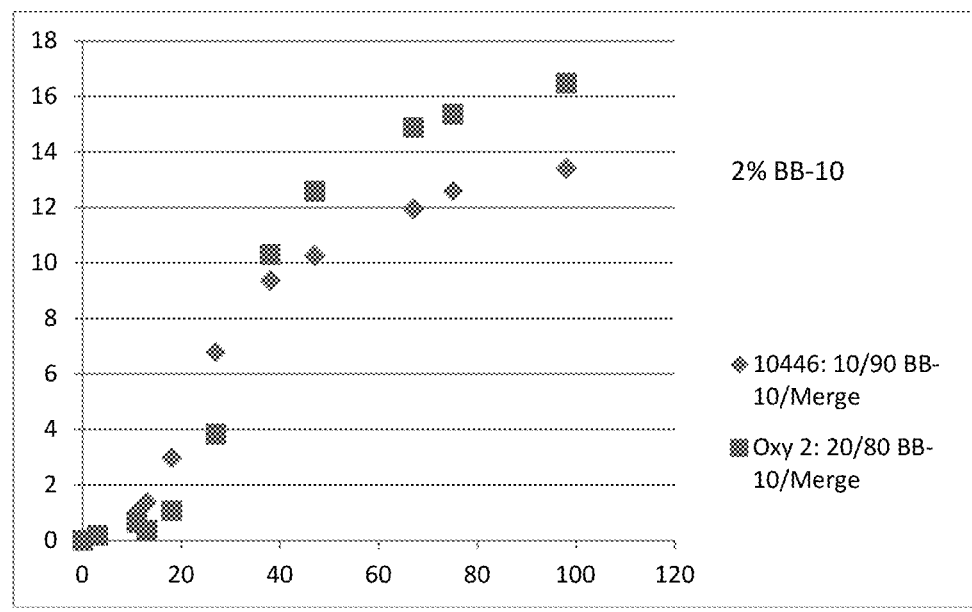
FIG. 17A is a graph showing the effect of the scavenging polymer-to-catalyst concentrate ratio on the oxygen absorption continues over time for multi-layer container (#10446) having the layers: 12 mil CPET/4 mil blend (10% BB-10™ component+90% Merge™ component)/4 mil APET; where the container has 2% total BB-10™ component, and for multi-layer container (#Oxy 2) having the layers: 12 mil CPET/2 mil blend (20% BB-10™ component+80% Merge™ component)/6 mil APET; where the container has 2% total BB-10™ component, for over 100 days.
FIG. 17B is a table of the data shown in FIG. 17A.

FIG. 17A is a graph showing the effect of the scavenging component-to-catalyst concentrate ratio on the oxygen absorption continues over time for multi-layer container (#10446) having the layers: 12 mil CPET/4 mil blend (10% BB-10™ component+90% Merge™ component)/4 mil APET; where the container has 2% total BB-10™ component, and for multi-layer container (#Oxy 2) having the layers: 12 mil CPET/2 mil blend (20% BB-10 component+80% Merge™ component)/6 mil APET; where the container has 2% total BB-10™ component, for over 100 days. FIG. 17B is a table of the data shown in FIG. 17A.

Figures 18A, 18B:
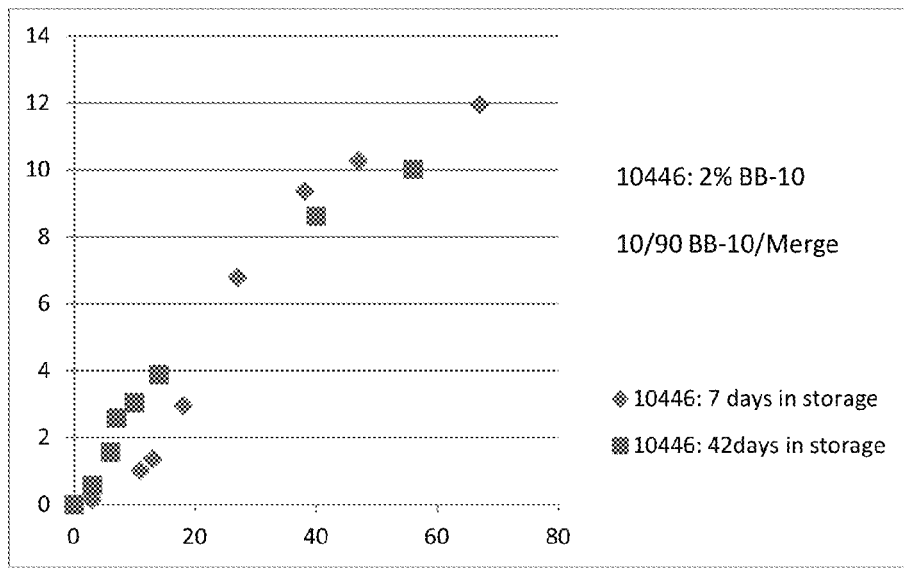
FIG. 18A is a graph showing the effect of the storage time-on the oxygen absorption over time for multi-layer container (#10446) having the layers: 12 mil CPET/4 mil blend (10% BB-10™ component+90% Merge™ component)/4 mil APET; where the container has 2% total BB-10™ component.
FIG. 18B is a table of the data shown in FIG. 18A.

FIG. 18A is a graph showing the effect of the storage time-on the oxygen absorption over time for multi-layer container (#10446) having the layers: 12 mil CPET/4 mil blend (10% BB-10™ component+90% Merge™ component)/4 mil APET; where the container has 2% total BB-10™ component. FIG. 18B is a table of the data shown in FIG. 18A.

Figures 19A, 19B:
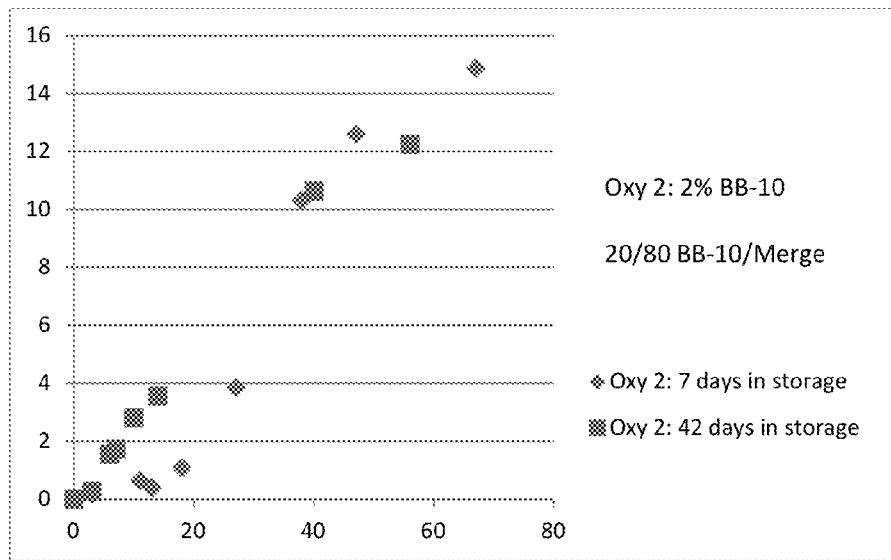
FIG. 19A is a graph showing the effect of the storage time on the oxygen absorption over time for multi-layer container (#Oxy2) having the layers: 12 mil CPET/2 mil blend (20% BB-10™ component+80% Merge™ component)/6 mil APET; where the container has 2% total BB-10™ component.
FIG. 19B is a table of the data shown in FIG. 19A.

FIG. 19A is a graph showing the effect of the storage time on the oxygen absorption over time for multi-layer container (#Oxy2) having the layers: 12 mil CPET/2 mil blend (20% BB-10™ component+80% Merge™ component)/6 mil APET; where the container has 2% total BB-10™ component. FIG. 19B is a table of the data shown in FIG. 19A.

Figures 20A, 20B:
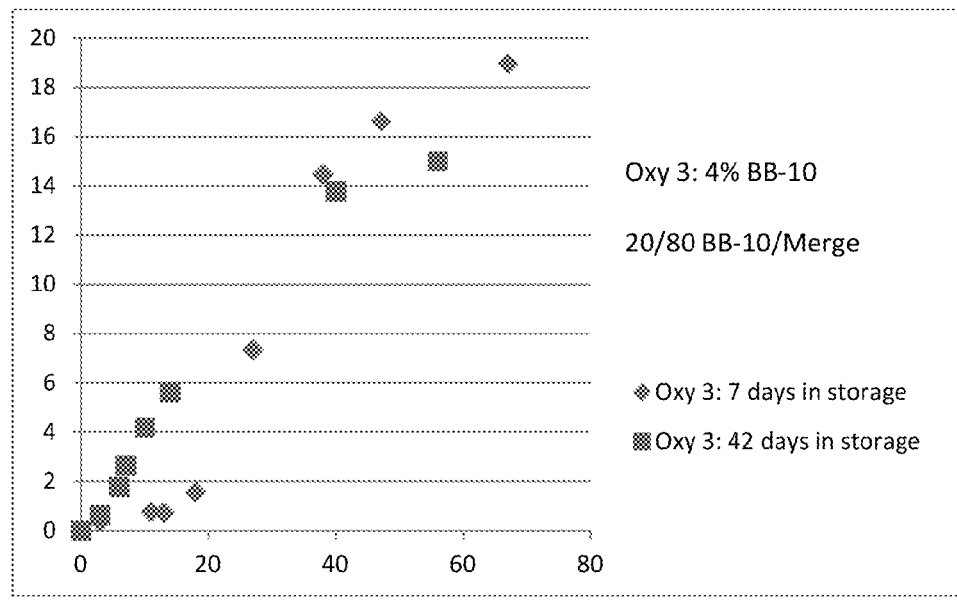
FIG. 20A is a graph showing the effect of the storage time on the oxygen absorption over time for multi-layer container (#Oxy 3) having the layers: 12 mil CPET/4 mil blend (20% BB-10™ component+80% Merge™ component)/4 mil APET; where the container has 4% total BB-10™ component.
FIG. 20B is a table of the data shown in FIG. 20A.

FIG. 20A is a graph showing the effect of the storage time on the oxygen absorption over time for multi-layer container (#Oxy 3) having the layers: 12 mil CPET/4 mil blend (20% BB-10™ component+80% Merge™ component)/4 mil APET; where the container has 4% total BB-10™ component. FIG. 20B is a table of the data shown in FIG. 8A.

Figures 21A, 21B:
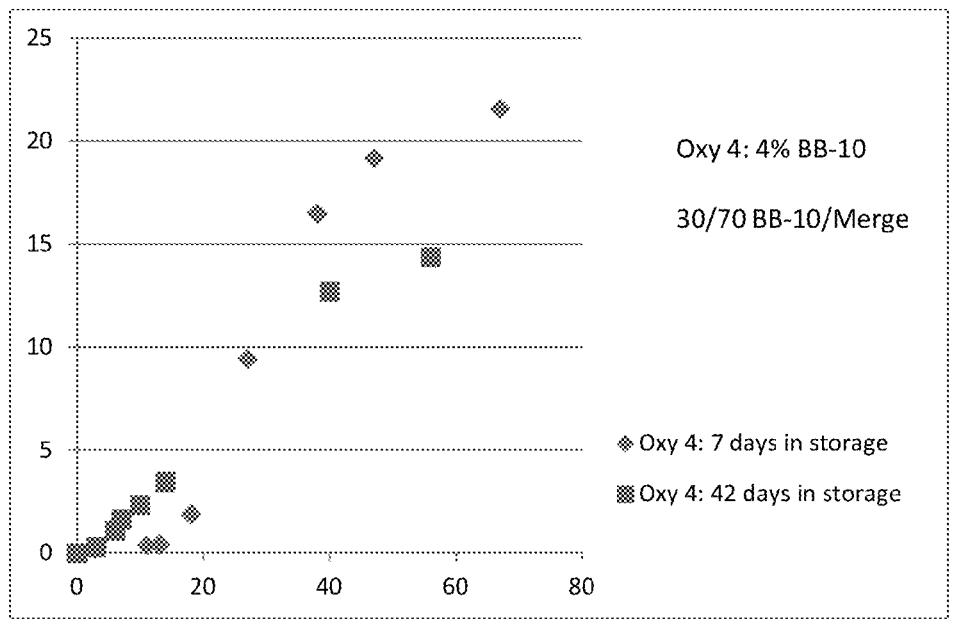
FIG. 21A is a graph showing the effect of the storage time on the oxygen absorption over time for multi-layer container (#Oxy 4) having the layers: 12 mil CPET/2.7 mil blend (30% BB-10™ component+70% Merge™ component)/5.3 mil APET; where the container has 4% total BB-10™ component.
FIG. 21B is a table of the data shown in FIG. 21A.

FIG. 21A is a graph showing the effect of the storage time on the oxygen absorption over time for multi-layer container (#Oxy 4) having the layers: 12 mil CPET/2.7 mil blend (30% BB-10™ component+70% Merge™ component)/5.3 mil APET; where the container has 4% total BB-10™ component. FIG. 21B is a table of the data shown in FIG. 21A.

Figures 22A, 22B:
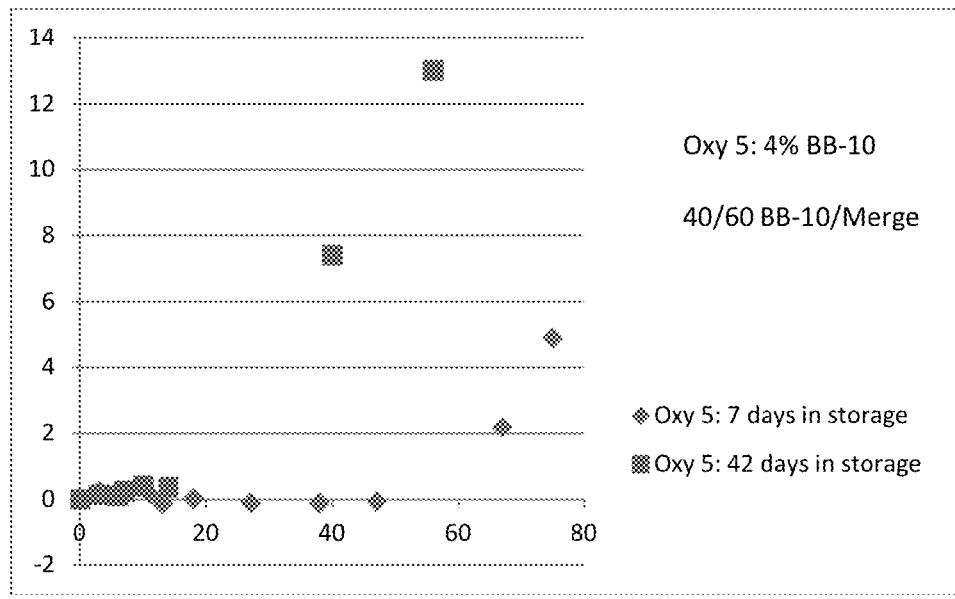
FIG. 22A is a graph showing the effect of the storage time on the oxygen absorption over time for multi-layer container (#Oxy 5) having the layers: 12 mil CPET/2 mil blend (40% BB-10™ component+60% Merge™ component)/6 mil APET; where the container has 4% total BB-10™ component.
FIG. 22B is a table of the data shown in FIG. 22A.

FIG. 22A is a graph showing the effect of the storage time on the oxygen absorption over time for multi-layer container (#Oxy 5) having the layers: 12 mil CPET/2 mil blend (40% BB-10™ component+60% Merge™ component)/6 mil APET; where the container has 4% total BB-10™ component. FIG. 22B is a table of the data shown in FIG. 22A.

This experiment was first conducted 7 days after the containers were made. The same experiment was then repeated 42 days after the containers were made. From FIGS. 18A-22B, it is now shown that that the containers, except Oxy 5, after 42-day storage absorb oxygen immediately while those after 7-day storage have an incubation time in oxygen absorption.

The incubation time based on the first experiment (7-day storage) is summarized in the table shown in FIG. 23, summarizing the data of FIGS. 18A-18B, FIGS. 19A-19B, FIGS. 20A-20B, FIGS. 21A-21B and FIGS. 22A-22B showing the effect of varying the scavenging component-to-catalyst concentrate ratio on the oxygen absorption incubation time.

The incubation time increased with the BB-10™ component/Merge™ component ratio. Container Oxy 5, which has a 40:60 BB-10™ component/Merge™ component ratio, had a 60-day incubation time. The long incubation time of container Oxy 5 was also confirmed by the second experiment. After 42-day storage, container Oxy 5 still had a 20-day incubation time. Since the incubation time of containers #10446, Oxy 2, Oxy 3, Oxy 4 and Oxy 5 were all less than 42 days, those containers showed no incubation time during the second experiment.

Example 8

Scavenging Component/Catalyst Component Ratio in Multilayer Container as Affecting Oxygen Permeation The effect of varying scavenging polymer-to-concentrate ratio on oxygen permeation was determined by measuring the oxygen permeation in a series of containers with different scavenging polymer-to-concentrate ratios. The containers were sealed with a glass plate in a low oxygen chamber. The initial headspace oxygen inside the containers was about 1-2%. The headspace oxygen concentration was measured periodically by a non-invasive oxygen analyzer sold by Oxysense Inc. to obtain the oxygen permeation rate. The headspace oxygen of the APET control container increased with time while that of the multi-layer container showed reduced oxygen permeation or even negative permeation.

Figures 24A, 24B:
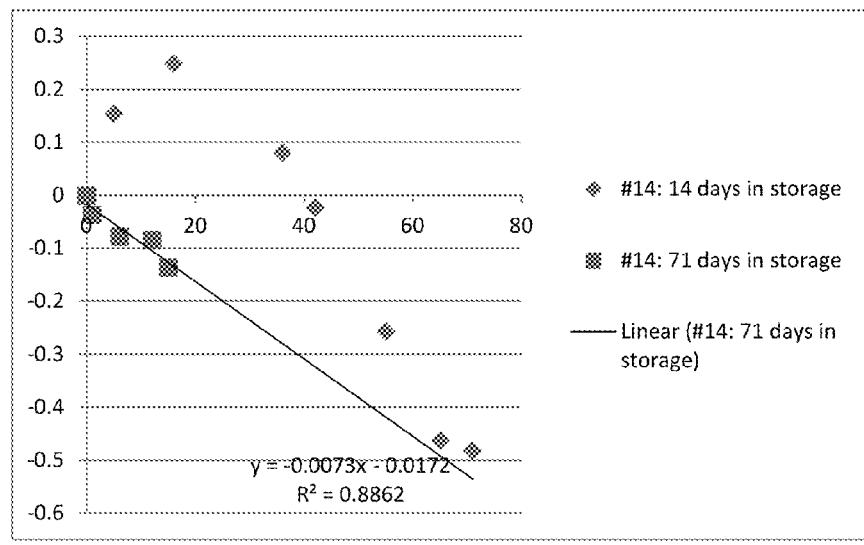
FIG. 24A is a graph showing the effect of varying the storage time on the oxygen permeation for a multi-layer container having the layers: 6.6 mil APET/2.2 mil blend (25% BB-10® component+75% Merge® component/2.2 mil APET, where the container has 5% total BB-10® component; data was gathered from each container after two different storage times.
FIG. 24B is a table of the data shown in FIG. 24A.
Figures 25A, 25B:
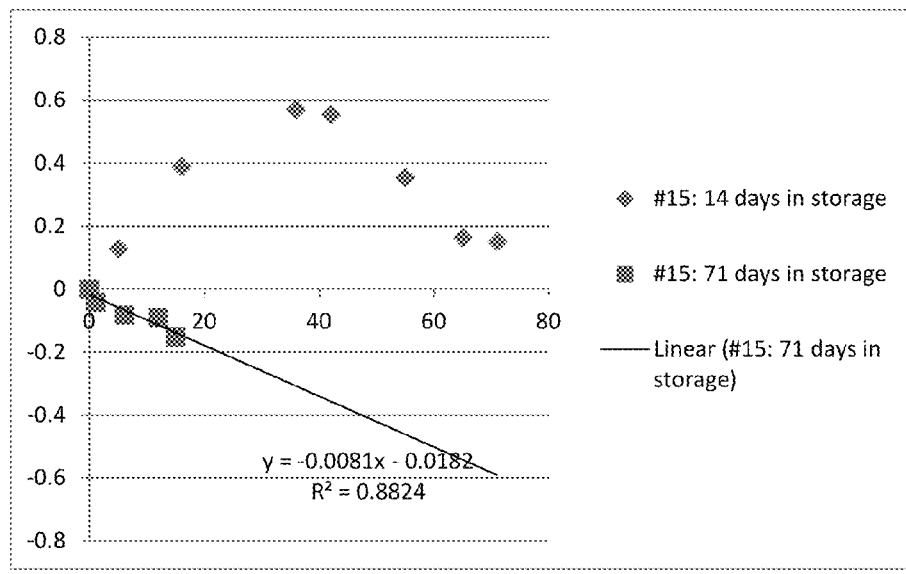
FIG. 25A is a graph showing the effect of varying the storage time on the oxygen permeation for a multi-layer container having the layers: 6.6 mil APET/1.7 mil blend (33% BB-10® component+67% Merge® component/2.7 mil APET, where the container has 5% total BB-10 component; data was gathered from each container after two different storage times.
FIG. 25B is a table of the data shown in FIG. 25A.
Figures 26A, 26B:
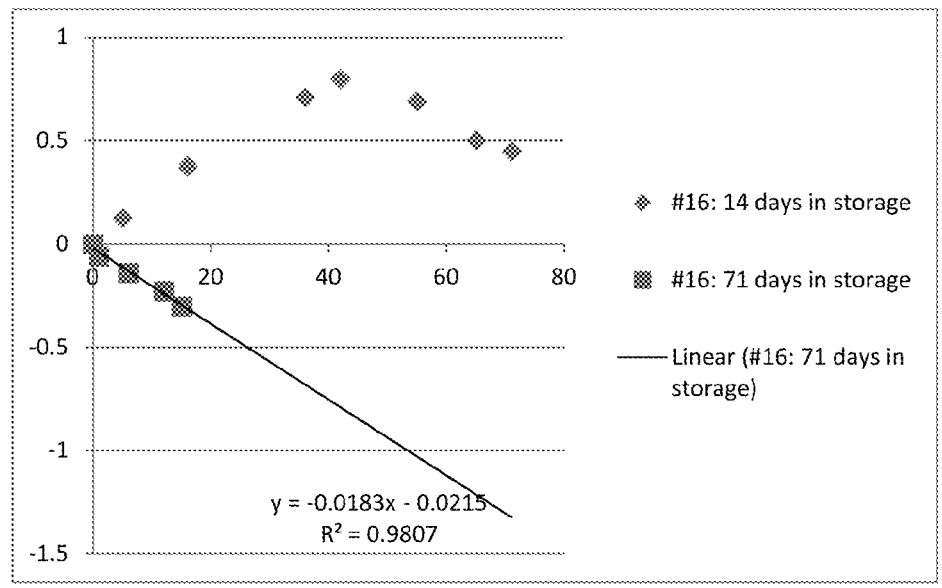
FIG. 26A is a graph showing the effect of varying the storage time on the oxygen permeation for a multi-layer container having the layers: 6.6 mil APET/1.13 mil blend (50% BB-10® component+50% Merge® component/3.3 mil APET, where the container has 5% total BB-10® component; data was gathered from each container after two different storage times.
FIG. 26B is a table of the data shown in FIG. 26A.

This experiment was first conducted 14 days after the containers were made. The same experiment was repeated 71 days after the containers were made. From FIGS. 24-26. It is determined that the containers after 71-day storage absorbed oxygen immediately while those after 14-day storage had an initial positive oxygen permeation due to the incubation time of oxygen absorption. The transition time of changing from positive permeation to negative permeation is determined by the incubation time.

The transition time based on the first experiment (14-day storage) is summarized in the table shown in FIG. 27. As can be seen from these experiments, the transition time increases with the scavenging polymer-to-concentrate ratio.

Certain embodiments of the multi-layer container disclosed herein are defined in the examples herein. It should be understood that these examples, while indicating particular embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various usages and conditions. Various changes may be made and equivalents may be substituted for elements thereof without departing from the essential scope of the invention. In addition, many modifications may be made to adapt a particular situation or material to the teachings of the invention without departing from the essential scope thereof.

What is claimed is:

1. A multi-layer container comprising:
   an outer layer;
   an inner layer; and
   at least one middle layer interposed therebetween;
   the middle layer including a blend of: at least one oxygen-scavenging component, at least one catalyst-containing concentrate, and a polymer consisting essentially of polyethylene terephthalate (PET);
   wherein the middle layer contains at least one catalyst transition metal up to about 3%, by weight, of the multi-layer container; and
   wherein at least one of the outer layer and the inner layer comprises a polymer consisting essentially of amorphous poly(ethylene terephthalate) (APET).

2. The multi-layer container of claim 1, wherein the catalyst-containing concentrate includes one or more oxidation catalyst.

3. The multi-layer container of claim 1, wherein the catalyst-containing concentrate depends on the scavenging component.

4. The multi-layer container of claim 1, wherein the catalyst-containing concentrate depends on the ability to co-process (e.g., co-extrusion or co-injection) with the scavenging component.

5. The multi-layer container of claim 1, wherein the catalyst-containing concentrate includes a transition metal selected from cobalt, copper, rhodium, ruthenium, palladium, tungsten, osmium, cadmium, silver, tantalum, hafnium, vanadium, titanium, chromium, nickel, zinc, and manganese.

6. The multi-layer container of claim 1, wherein the catalyst-containing concentrate includes a transition metal in the form of a salt.

7. The multi-layer container of claim 1, wherein the catalyst-containing concentrate includes a transition metal in the form of a salt, and wherein counter ions for the metal include one or more of carboxylates, including neodecanoates, octanoates, stearates, acetates, naphthalates, lactates, maleates, acetylacetonates, linoleates, oleates, palminates, 2-ethyl hexanoates, oxides, borides, carbonates, chlorides, dioxides, hydroxides, nitrates, phosphates, sulfates, and, silicates.

8. The multi-layer container of claim 1, wherein the catalyst-containing concentrate includes at least one of cobalt stearate or cobalt acetate that is present in a total concentration not exceeding about 3%, by weight, of the multi-layer container.

9. The multi-layer container of claim 1, wherein the catalyst-containing concentrate comprises an oxidation catalyst blended with PET.

10. The multi-layer container of claim 1, wherein a ratio of oxygen-scavenging component to catalyst-containing concentrate is about 5:95.

11. The multi-layer container of claim 1, wherein a ratio of oxygen-scavenging component to catalyst-containing concentrate is about 10:90.

12. The multi-layer container of claim 1, wherein a ratio of oxygen-scavenging component to catalyst-containing concentrate is about 20:80.

13. The multi-layer container of claim 1, wherein a ratio of oxygen-scavenging component to catalyst-containing concentrate is about 30:70.

14. The multi-layer container of claim 1, wherein a ratio of oxygen-scavenging component to catalyst-containing concentrate is about 40:60.

15. The multi-layer container of claim 1, wherein a ratio of oxygen-scavenging component to catalyst-containing concentrate is about 50:50.

16. The multi-layer container of claim 1, wherein a ratio of oxygen-scavenging component to catalyst-containing concentrate is about 60:40.

17. The multi-layer container of claim 1, wherein a total concentration of oxygen-scavenging component in the middle layer is at least about 10%, by weight, of the multi-layer container.

18. The multi-layer container of claim 1, wherein a total concentration of oxygen-scavenging component in the middle layer is at least about 5%, by weight, of the multi-layer container.

19. The multi-layer container of claim 1, wherein a total concentration of oxygen-scavenging component in the middle layer is at least about 3%, by weight, of the multi-layer container.

20. The multi-layer container of claim 1, wherein a total concentration of oxygen-scavenging component in the middle layer is at least about 2%, by weight, of the multi-layer container.

21. The multi-layer container of claim 1, wherein a total concentration of oxygen-scavenging component in the middle layer is at least about 1%, by weight, of the multi-layer container.

22. The multi-layer container of claim 1, wherein a total concentration of oxygen-scavenging component in the middle layer is at least about 0.5%, by weight, of the multi-layer container.

23. The multi-layer container of claim 1, wherein the outer layer of the multi-layer container has an oxygen permeation rate of no greater than about 3 cc $O_2$/100 $in^2 \cdot day \cdot atm$.

24. The multi-layer container of claim 1, wherein the outer layer of the multi-layer container has an oxygen permeation rate of no greater than about 2 cc $O_2$/100 $in^2 \cdot day \cdot atm$.

25. The multi-layer container of claim 1, wherein the outer layer of the multi-layer container has an oxygen permeation rate of no greater than about 1.5 cc $O_2$/100 $in^2 \cdot day \cdot atm$.

26. The multi-layer container of claim 1, wherein the outer layer of the multi-layer container has an oxygen permeation rate of no greater than about 1 cc $O_2$/100 $in^2 \cdot day \cdot atm$.

27. The multi-layer container of claim 1, wherein the outer layer of the multi-layer container has an oxygen permeation rate of no greater than about 0.5 cc $O_2$/100 $in^2$·day·atm.

28. The multi-layer container of claim 1, wherein the outer layer of the multi-layer container has an oxygen permeation rate of no greater than about 0 cc $O_2$/100 $in^2$·day·atm.

29. The multi-layer container of claim 1, wherein the outer layer of the multi-layer container has an oxygen permeation rate of less than about 0 cc $O_2$/100 $in^2$·day·atm.

30. The multi-layer container of claim 1, wherein the multi-layer container has an oxygen headspace absorption effect of about 0 cc $O_2$ ingress after about 5 days.

31. The multi-layer container of claim 1, wherein the multi-layer container has an oxygen headspace absorption effect of less than about 0 cc $O_2$ ingress after about 5 days.

32. The multi-layer container of claim 1, wherein the multi-layer container has an oxygen headspace absorption effect of more than about 0.3% headspace oxygen reduction after about 20 days.

33. The multi-layer container of claim 1, wherein the multi-layer container has an oxygen absorption effect of that increases over time after about 5 days after manufacturing of the multi-layer container.

34. The multi-layer container of claim 1, wherein the middle layer has an oxygen-scavenging component to catalyst-containing concentrate ratio of greater than about 0.05.

35. The multi-layer container of claim 1, wherein substantially no adhesive material is interposed between the middle layer and the outer layer and/or the middle layer and the inner layer.

36. The multi-layer container of claim 1, wherein both the outer layer and the inner layer comprise an amorphous poly(ethylene terephthalate) polymer (APET).

37. The multi-layer container of claim 1, wherein the blend of the oxygen-scavenging polymer and the catalyst-containing concentrate is present in the middle layer at about a 50:50 ratio.

38. The multi-layer container of claim 1, wherein the blend of the one oxygen-scavenging polymer and the catalyst-containing concentrate is present in the middle layer at about a 50:50 ratio; and wherein the middle layer has a thickness of about 0.5 mil.

39. The multi-layer container of claim 1, wherein the blend of the one oxygen-scavenging polymer and the catalyst-containing concentrate is present in the middle layer at about a 50:50 ratio; and, the multi-layer container having an oxygen absorption of about 50 cc $O_2$, per gram of oxygen-scavenging polymer, present in the multi-layer container.

40. The multi-layer container of claim 1, wherein the outer layer has a thickness of about 1 mil or more.

41. The multi-layer container of claim 1, wherein the oxygen-scavenging component in the middle layer is present in an amount of at least about 0.5%, by weight, of the multi-layer container.

42. The multi-layer container of claim 1, wherein the oxygen-scavenging component in the middle layer is present in an amount of at least about 1%, by weight, of the multi-layer container.

43. The multi-layer container of claim 1, wherein the oxygen-scavenging component in the middle layer is present in an amount of at least about 2%, by weight, of the multi-layer container.

44. The multi-layer container of claim 1, wherein the oxygen-scavenging component in the middle layer is present in an amount of at least about 2%, by weight, of the multi-layer container.

45. The multi-layer container of claim 1, wherein a ratio of the oxygen-scavenging component present to catalyst-containing concentrate in the middle layer is about 5:95.

46. The multi-layer container of claim 1, wherein the oxygen-scavenging component present is at least about 2% or greater, by weight, of the multi-layer container.

47. The multi-layer container of claim 1, wherein the multi-layer container has an oxygen absorption of at least about 50 cc $O_2$, per gram of oxygen-scavenging component.

48. A multi-layer container comprising:
   an outer layer;
   an inner layer; and
   at least one middle layer interposed therebetween;
   the middle layer including a blend of: at least one oxygen-scavenging component, at least one catalyst-containing concentrate, and a polymer consisting essentially of polyethylene terephthalate (PET); wherein the middle layer contains at least one catalyst transition metal up to about 3%, by weight, of the multi-layer container;
   the multi-layer container having:
   i) a ratio of oxygen-scavenging component to catalyst-containing concentrate of about 5:95;
   ii) a total concentration of oxygen-scavenging component in the middle layer of at least about 0.5%, by weight, of the multi-layer container;
   iii) an oxygen permeation rate of the outer layer no greater than about 3 cc $O_2$/100 $in^2$·day·atm;
   iv) an oxygen headspace absorption effect of about 0 cc $O_2$ ingress after about 5 days; and
   v) an oxygen absorption effect of that increases over time after about 5 days after manufacturing of the multi-layer container.

49. A method of making the multi-layer container, comprising:
   a) providing a middle layer including a blend of: at least one oxygen-scavenging component; at least one catalyst-containing concentrate that contains at least one catalyst transition metal up to about 3%, by weight, of the multi-layer container; and, a polymer consisting essentially of polyethylene terephthalate (PET); and
   b) interposing the middle layer between at least one outer layer and at least one inner layer without the use of an adhesive material;
   wherein at least one of the outer layer and the inner layer comprises a polymer consisting essentially of amorphous poly(ethylene terephthalate) (APET).

* * * * *